(12) United States Patent
Lee et al.

(10) Patent No.: US 10,531,440 B2
(45) Date of Patent: Jan. 7, 2020

(54) APPARATUS FOR TRANSMITTING AND RECEIVING DOWNLINK DATA IN WIRELESS COMMUNICATIONS SYSTEM SUPPORTING COOPERATION BETWEEN TRANSMISSION POINTS AND METHOD THEREFOR

(71) Applicant: SAMSUNG ELECTRONICS CO., LTD., Suwon-si, Gyeonggi-do (KR)

(72) Inventors: Hyojin Lee, Suwon-si (KR); Younsun Kim, Seongnam-si (KR); Youngbum Kim, Seoul (KR); Joonyoung Cho, Suwon-si (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/989,994

(22) Filed: May 25, 2018

(65) Prior Publication Data

US 2018/0279288 A1 Sep. 27, 2018

Related U.S. Application Data

(63) Continuation of application No. 14/760,337, filed as application No. PCT/KR2014/000299 on Jan. 10, 2014, now Pat. No. 9,986,537.

(30) Foreign Application Priority Data

Jan. 11, 2013 (KR) .................. 10-2013-0003470

(51) Int. Cl.
*H04W 72/04* (2009.01)
*H04B 7/06* (2006.01)
(Continued)

(52) U.S. Cl.
CPC ...... *H04W 72/0406* (2013.01); *H04B 7/0626* (2013.01); *H04L 5/005* (2013.01);
(Continued)

(58) Field of Classification Search
CPC ............ H04W 72/0406; H04W 72/085; H04L 5/0035; H04L 5/005; H04B 7/0626
See application file for complete search history.

(56) References Cited

U.S. PATENT DOCUMENTS

| 8,885,576 B2 | 11/2014 | Kim |
| 9,986,537 B2 | 5/2018 | Lee et al. |

(Continued)

FOREIGN PATENT DOCUMENTS

| JP | 2012-044322 | 3/2012 |
| KR | 10-2011-0079424 | 7/2011 |

(Continued)

OTHER PUBLICATIONS

International Search Report corresponding to International Patent Application No. PCT/KR2014/000299 dated Mar. 31, 2014.

(Continued)

*Primary Examiner* — Wei Zhao
(74) *Attorney, Agent, or Firm* — The Farrell Law Firm, P.C.

(57) ABSTRACT

Disclosed are an apparatus for transmitting and receiving a downlink data in a wireless communications system supporting cooperation between transmission points and a method therefor. A method for transmitting a downlink data in a wireless communications system includes the steps of: transmitting the information on resources management collection including the CSI-RS information for measuring the terminal received power to a terminal; receiving a report of the received power measurement of the CSI-RS corresponding to the resources management collection from the terminal; determining the measurement collection including the CSI-RS information for the terminal to infer a channel based on the received power measurement report; and transmitting the resources mapped with data to the terminal based on the measurement collection.

24 Claims, 17 Drawing Sheets

(51) Int. Cl.
*H04L 5/00* (2006.01)
*H04W 72/08* (2009.01)
*H04B 7/024* (2017.01)

(52) U.S. Cl.
CPC ......... *H04L 5/0035* (2013.01); *H04W 72/085* (2013.01); *H04B 7/024* (2013.01); *H04L 5/0007* (2013.01); *H04L 5/0073* (2013.01); *H04W 72/042* (2013.01); *H04W 72/0453* (2013.01)

(56) References Cited

U.S. PATENT DOCUMENTS

| | | | |
|---|---|---|---|
| 2012/0076023 A1* | 3/2012 | Ko | H04B 7/0486 370/252 |
| 2013/0094442 A1 | 4/2013 | Kim et al. | |
| 2013/0176978 A1 | 7/2013 | Abe et al. | |
| 2013/0244676 A1 | 9/2013 | Koivisto | |
| 2013/0272158 A1* | 10/2013 | Park | H04W 52/242 370/252 |
| 2013/0294318 A1* | 11/2013 | Amerga | H04W 4/06 370/312 |
| 2015/0351085 A1 | 12/2015 | Lee et al. | |

FOREIGN PATENT DOCUMENTS

| | | |
|---|---|---|
| KR | 10-2012-0015927 | 2/2012 |
| KR | 10-2012-0089254 | 8/2012 |
| KR | 10-2012-0121299 | 11/2012 |

OTHER PUBLICATIONS

Younsun Kim et al., U.S. Appl. No. 61/607,697, Control Region Size Determination for Comp in Release 11, filed Mar. 7, 2012.
Intel Corporation, Uplink Power Control Discussion for CoMP Scenario 4, R1-111598, 3GPP TSG-RAN WG1 #65, Barcelona, Spain, May 9-13, 2011 (http://www.3gpp.org/ftp/tsg_ran/wg1_rl1/TSGR1_65/Docs/R1-111598.zip).
Korean Office Action dated May 16, 2019 issued in counterpart application No. 10-2013-0003470, 8 pages.

* cited by examiner

RESOURCE MAPPING SEQUENCE

CSI-RS RESOURCE INCLUDED IN COMP MEASUREMENT SET

CSI-RS RESOURCE NOT INCLUDED IN COMP MEASUREMENT SET

CSI-RS RESOURCE APPLIED WITH RATE MATCHING

CSI-RS RESOURCE NOT APPLIED WITH RATE MATCHING

APPARATUS FOR TRANSMITTING AND RECEIVING DOWNLINK DATA IN WIRELESS COMMUNICATIONS SYSTEM SUPPORTING COOPERATION BETWEEN TRANSMISSION POINTS AND METHOD THEREFOR

CROSS-REFERENCE TO RELATED APPLICATIONS/INCORPORATION BY REFERENCE

This application is a continuation of U.S. application Ser. No. 14/760,337, filed on Jul. 10, 2015, expected to issue as U.S. Pat. No. 9,986,537 on May 29, 2018, entitled "APPARATUS FOR TRANSMITTING AND RECEIVING DOWNLINK DATA IN WIRELESS COMMUNICATIONS SYSTEM SUPPORTING COOPERATION BETWEEN TRANSMISSION POINTS AND METHOD THEREFOR" which is a 371 of International Patent Application No. PCT/KR2014/000299, filed Jan. 10, 2014, entitled "APPARATUS FOR TRANSMITTING AND RECEIVING DOWNLINK DATA IN WIRELESS COMMUNICATIONS SYSTEM SUPPORTING COOPERATION BETWEEN TRANSMISSION POINTS AND METHOD THEREFOR", which claims priority to Korean Patent Application No. KR 10-2013-0003470, filed Jan. 11, 2013. The above-identified applications are hereby incorporated herein by reference in their entirety.

TECHNICAL FIELD

The present invention relates to an apparatus and a method for transmitting and receiving downlink data in a wireless communication system that adopts a cooperative multi-point (CoMP) scheme.

BACKGROUND ART

A wireless communication system has been developed into a high speed and high quality wireless packet data communication system to provide a data service and a multimedia service as well as a basic voice service. Recently, various wireless communication standards, such as high speed downlink packet access (HSDPA), high speed uplink packet access (HSUPA), long term evolution (LTE), or long term evolution advanced (LTE-A) in 3GPP, high rate packet data (HRPD) in 3GPP2, or IEEE 802.16, have been developed to support the high speed and high quality wireless packet data transmission service.

The LTE system, which has been developed to effectively support the high speed wireless packet data transmission, may maximize the capacity of the wireless system by utilizing various wireless access technologies. In addition, the LTE-A system, which is the advanced wireless system of the LTE system, has an improved data transmission ability compared to the LTE system.

The existing third wireless packet data communication systems, such as the HSDPA, the HSUPA, and the HRPD, use an adaptive modulation and coding (AMC) method and a channel sensitive scheduling method in order to enhance the transmission efficiency. At this time, according to the AMC method and the channel sensitive scheduling method, a proper modulation and coding scheme may be applied at a time determined to be most effective by receiving the feedback of partial channel quality information from a receiver.

A transmitter, in the wireless packet data communication system to which the AMC method is applied, may adjust the amount of transmission data according to the channel state. That is, in a bad channel state, the transmitter may reduce the amount of transmission data to thereby maintain the reception error probability within a desired level. In addition, in a good channel state, the transmitter may increase the amount of transmission data to effectively transmit a lot of information while maintaining the reception error probability within a desired level.

In the wireless packet data communication system to which the channel sensitive scheduling resource management method is applied, since the transmitter may selectively provide a service to a user in a good channel state among a plurality of users, the system capacity can be increased compared with a method in which the channel is allocated to a single user for a service. Such an increase in the capacity is called a multi-user diversity gain. The AMC method may include a function of determining the number of spatial layers or the ranks of a transmitted signal when it is used together with the multiple input multiple output (MIMO) transmission method. In this case, the wireless packet data communication system applied with the AMC method may determine an optimal data transmission rate by considering the number of transmission layers using the MIMO as well as a coding rate and a modulation scheme.

In general, the OFDMA method can expect an increase in the capacity, compared to the CDMA method. One reason that the increase in the capacity is expected in the OFDMA method is that frequency-domain scheduling can be performed. The capacity gain is obtained through the channel sensitive scheduling method according to the characteristic in which the channel varies with time. Likewise, the more capacity gain may be obtained by utilizing the characteristic in which the channel varies with frequency. Accordingly, vibrant studies for converting the code division multiple access (CDMA), which is a multiple access method that has been used in the second and the third wireless communication systems, into the orthogonal frequency division multiple access (OFDMA) in the next system are in progress. In addition, the 3GPP and the 3GPP2 began to proceed with the standardization of the evolution system for using the OFDMA.

Meanwhile, the LTE-A system has provided CoMP transmission technology in which a plurality of cells performs cooperative transmission with respect to a terminal. In addition, in the case of the CoMP transmission technology, the terminal may be allocated with a plurality of CSI-RSs in a resource block transmitted from a base station to the terminal for the effective channel estimation from a plurality of cells, and thus, a CoMP data transmitting and receiving method considering a plurality of CSI-RSs is required.

In order to effectively use the CoMP scheme in the LTE-A system, it is required to receive the downlink data, for example, a physical downlink shared channel (PDSCH), in consideration of channel state information reference signal (CSI-RS) resources transmitted from the cells corresponding to a plurality of transmission points.

However, in the current LTE-A system, since the PDSCH signals are received on the assumption that the downlink data is not mapped in all of the CSI-RS resources allocated to the terminal, the allocation of a plurality of CSI-RSs may cause a waste of resources.

DETAILED DESCRIPTION OF THE INVENTION

Technical Problem

The present invention has been made to provide an apparatus and a method for transmitting and receiving the downlink data by effectively utilizing the resources in the case where a plurality of CSI-RSs is allocated to the terminal for channel estimation.

Technical Solution

In order to address the technical problem above, the present invention provides a method for transmitting downlink data in a wireless communication system, which may include: transmitting resource management set information including CSI-RS information for measuring the received power of a terminal to the terminal; receiving a received power measurement report of CSI-RSs corresponding to the resource management set from the terminal; determining a measurement set including CSI-RS information by which the terminal performs channel estimation, based on the received power measurement report; and transmitting resources mapped with data on the basis of the measurement set to the terminal.

In accordance with another aspect of the present invention, a method for receiving downlink data in a wireless communication system may include: receiving resource management set information including CSI-RS information for measuring the received power from a central control device; transmitting a received power measurement report of CSI-RSs corresponding to the resource management set to the central control device; and receiving a resource mapped with data on the basis of a measurement set including CSI-RS information determined for channel estimation according to the received power measurement report, from the central control device, and restoring the data.

In accordance with still another aspect of the present invention, an apparatus for transmitting downlink data in a wireless communication system may include: a communication unit that transmits and receives data to and from a terminal; and a control unit that transmits resource management set information including CSI-RS information for measuring the received power of the terminal to the terminal, determines a measurement set including CSI-RS information by which the terminal performs channel estimation, based on a received power measurement report of CSI-RSs corresponding to the resource management set, which received from the terminal, and transmits resources mapped with data on the basis of the measurement set to the terminal.

In accordance with another further aspect of the present invention, an apparatus for receiving downlink data in a wireless communication system may include: a communication unit that transmits and receives data to and from a central control device that transmits the downlink data; and a control unit that receives resource management set information including CSI-RS information for measuring the received power from a central control device, transmits a received power measurement report of CSI-RSs corresponding to the resource management set to the central control device, and receives a resource mapped with data on the basis of a measurement set including CSI-RS information determined for channel estimation according to the received power measurement report, from the central control device, to thereby restore the data.

Advantageous Effects

According to the present invention, nearby cells can cooperatively transmit data through the inter-cell cooperative transmission (CoMP) for the terminal located at the edge of the cell in the cellular wireless communication system.

In addition, the cells can provide improved wireless communication services, compared with the case where the cells do not cooperate with each other. The terminal located at the edge of the cell can dynamically determine the cell from which the terminal is to receive data.

In addition, a plurality of cells can simultaneously transmit information to the terminal located at the edge of the cell to thereby enhance an information reception rate of the terminal. According to this, all of the terminals in the cellular mobile communication system can obtain a high data reception rate regardless of the locations thereof in the cell.

Furthermore, according to the present invention, the type of CSI-RS resource is recognized in the wireless communication system using the CoMP scheme to perform the CSI-RS channel measurement, and at the same time, to receive the PDSCH signal in a specific CSI-RS resource so that the effective downlink data transmission and reception is possible.

MODE FOR CARRYING OUT THE INVENTION

Hereinafter, embodiments of the present invention will be described in detail with reference to the accompanying drawings. In the following description of the present invention, a detailed description of known functions or configurations incorporated herein will be omitted when it may make the subject matter of the present invention rather unclear. The terms which will be described below are terms defined in consideration of the functions in the present disclosure, and may be different according to users, intentions of the users, or customs. Accordingly, the definitions of the terms should be made on the basis of the overall context of the embodiments.

Further, the detailed description of embodiments of the present invention is made mainly based on a wireless communication system based on OFDM, particularly 3GPP EUTRA standard, but the subject matter of the present invention can be applied to other communication systems having a similar technical background and channel form after a little modification without departing from the scope of the present invention and the above can be determined by those skilled in the art.

Figure 1:
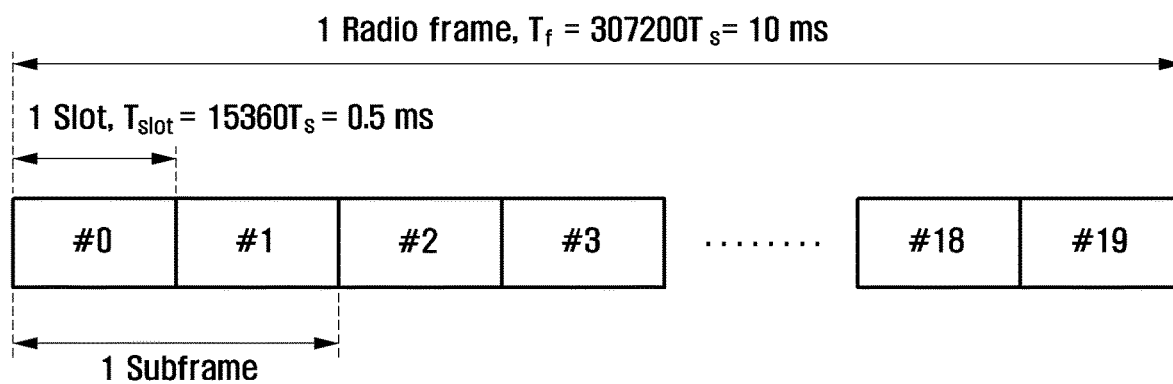
FIG. 1 illustrates a radio frame structure of the LTE-A system.

FIG. 1 illustrates a radio frame structure of the LTE-A system to which the present invention is applied.

Referring to FIG. 1, one radio frame is comprised of 10 subframes, and each subframe is comprised of two slots. The subframes have indexes of 0 to 9 in the radio frame, and the slots have indexes of 0 to 19 (#0 to #19) as shown in FIG. 1.

Figure 2:
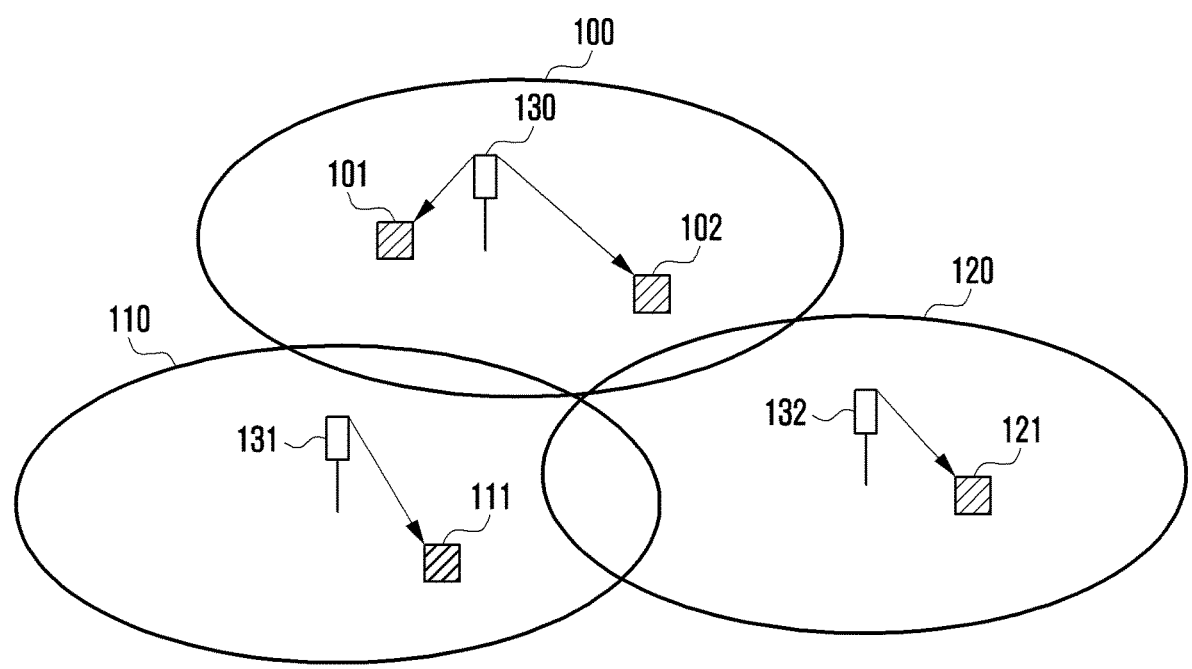
FIG. 2 illustrates a cellular wireless communication system in which transmission/reception antennas are disposed in the center of the cells according to the prior art.

FIG. 2 illustrates a cellular wireless communication system in which transmission/reception antennas are disposed in the center of the cells according to the prior art.

Referring to FIG. 2, specific user equipment (UE) is provided with a wireless communication service from a selected single cell for a semi-static period in various ways mentioned above in a cellular wireless communication system comprised of a plurality of cells.

For example, the cellular wireless communication system includes three cells 100, 110, and 120. In addition, the cell 100 provides a wireless communication service to a terminal 101 and a terminal 102, and the cell 110 and the cell 120 provide a wireless communication service to a terminal 111 and a terminal 121, respectively. Reference numerals 130, 131, and 132 may be evolved Node Bs (eNB) of the cells 100, 110, and 120.

The terminal 102, which is provided with a wireless communication service in the cell 100, is relatively far from the base station 130, compared with the terminal 102. In addition, the terminal 102 undergoes interference from the base station 132 of another cell 120, so the data transmission speed thereof from the cell 100 is relatively low.

When the cells 100, 120, and 130 independently provide wireless communication services as shown in FIG. 2, the base stations 130, 131, and 132 transmit reference signals (RS) for channel estimation in order for the terminals 101, 102, 111, and 121 to measure downlink channel states of the cells. In addition, in the case of the 3GPP LTE-A system, the terminals 101, 102, 111, and 121 measure the channel status between the base stations 130, 131 and 132, and the terminals 101, 102, 111 and 121 using channel status information reference signals (CSI-RS) transmitted from the base stations 130, 131 and 132.

Figure 3:
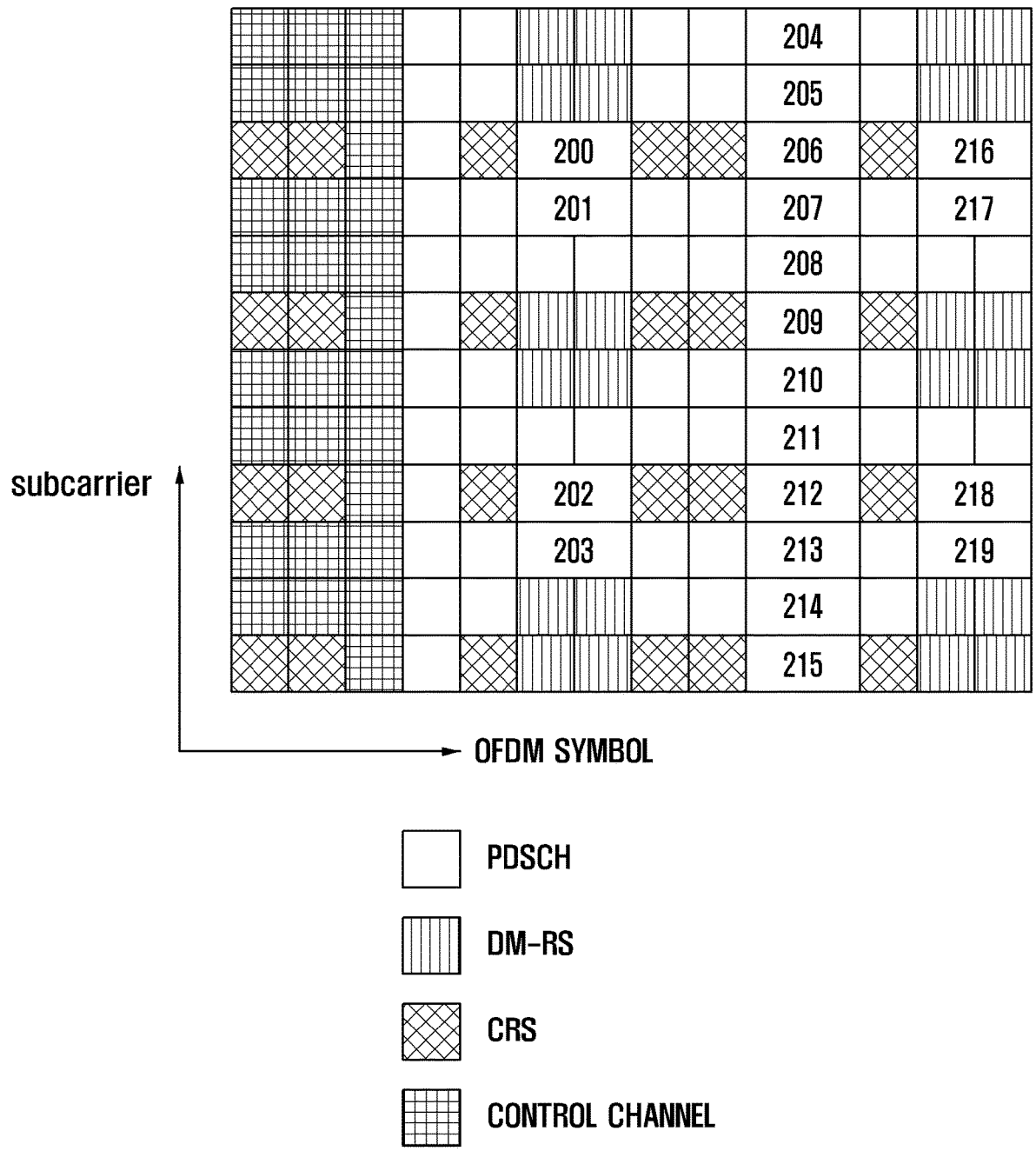
FIG. 3 illustrates an example in which the CSI-RSs are allocated in a resource block transmitted from a base station to a terminal in the LTE-A system according to the prior art.

FIG. 3 illustrates an example in which the CSI-RSs are allocated in a resource block transmitted from the base station to the terminal in the LTE-A system according to the prior art. The description about signals allocated to the resource block is shown in FIG. 3, and the detailed definition thereof conforms to the LTE-A system-related standard.

Referring to FIG. 3, signals for two CSI-RS antenna ports may be transmitted with respect to each of the positions 200 to 219. For example, the base station may transmit the CSI-RSs of two ports for the downlink measurement in the position 200 to the terminal.

In the case of a cellular wireless communication system comprised of a plurality of cells, as shown in FIG. 2, different positions in the resource blocks of the cells may be allocated for the CSI-RS transmission. For example, in the case of the cell 100 in FIG. 2, the CSI-RS may be transmitted in the position 200 of FIG. 3, and in the case of the cell 110 and the cell 120, the CSI-RS may be transmitted in the position 205 and the position 210, respectively.

As described above, time and frequency resources for the CSI-RS transmission are allocated at different positions according to the cells in order to prevent the CSI-RSs transmitted in different cells from generating the interference with each other. The position of each CSI-RS resource in the resource block as set forth above may be determined by resourceConfig information that is a parameter transferred from the base station to the terminal through a radio resource control (RRC) signal in the upper layer.

The subframe by which the CSI-RS is transmitted in the downlink may be determined by a value of $I_{CSI-RS}$ that is mapped with subframeConfig information transmitted through the RRC signal. When $I_{CSI-RS}$ is received, the terminal may determine a period $T_{CSI-RS}$ of the subframe, in which the CSI-RS is transmitted, and an offset $\Delta_{CSI-RS}$ of the subframe, by which the CSI-RS is transmitted, based on Table 1 below.

TABLE 1

| CSI-RS-SubframeConfig $I_{CSI-RS}$ | CSI-RS Period $T_{CSI-RS}$ (Subframe) | CSI-RS Subframe Offset $\Delta_{CSI-RS}$ (Subframe) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Accordingly, the terminal may receive the CSI-RS in the subframe satisfying Equation 1 as follows.

$$(10n_f + [n_s/2] - \Delta_{CSI-RS}) \bmod T_{CSI-RS} = 0 \qquad \text{Equation 1}$$

In Equation 1, $n_f$ denotes a radio frame number, and $N_S$ denotes a slot number in the radio frame.

Meanwhile, in the case of the cellular wireless communication system shown in FIG. 2, the terminal located at the edge of the cell may be significantly influenced by the interference from other cells to have a difficulty in being supported at a high speed data transmission rate. That is, in the cellular wireless communication system as shown in FIG. 2, the high speed data service transmission rate provided to the terminals in the cell is significantly affected by the position of the terminal in the cell. Therefore, in the conventional cellular wireless communication system, the terminal located relatively close to the center of the cell may receive the data at a high speed transmission rate, whereas the terminal located relatively far from the center of the cell may not secure a high speed transmission rate.

As described above, the cellular wireless communication system is configured by establishing a plurality of cells in a limited area, and the base station dedicated to wireless communication in the cell provides a wireless communication service to the terminals. At this time, a specific terminal is provided with a wireless communication service from only a single cell that is semi-statically determined. Hereinafter, such a wireless communication system will be referred to as a non-CoMP system in contrast to the CoMP system.

As set forth above, in the non-CoMP system, the data transmission rate provided to all of the terminals in the cell may be quite different according to the position of the terminal in the cell. That is, the terminal located at the center of the cell may be supported at a high speed data transmission rate, whereas the terminal located relatively close to the edge of the cell may not be supported at a high speed data transmission rate.

On the contrary, in the CoMP system, a plurality of cells cooperates with each other to transmit the data in order to support a high speed data service to the terminal located at the edge of the cell. In this case, an improved wireless communication service can be provided in the entire area of the cell, compared to the non-CoMP system.

The present invention provides an apparatus and a method by which the terminal is allocated with a plurality of CSI-RSs in the resource area and receives a physical downlink shared channel (PDSCH) according thereto, in considerate of the case of using a dynamic cell selection (DS) scheme, a dynamic cell selection with dynamic blanking (DS/DB) scheme, a joint transmission (JT) scheme, or a coordinated scheduling/coordinated beamforming (CS/CB) scheme among the CoMP system.

The DS scheme refers to a method in which the terminal measures the channel status of a plurality of cells and transfers the feedback thereof to the base station, and the base station dynamically selects the cell that is to transmit the downlink data to the terminal. In addition, the DS/DB scheme refers to a method in which a specific cell does not transmit data in order to reduce the interference from the specific cell to other cells, and the JT scheme refers to a method in which a plurality of cells simultaneously transmit data to a specific terminal. In addition, the CS/CB scheme means a method by which a frequency resource and a pre-coding method are selected in order to minimize the interference with respect to nearby cells in performing data transmission scheduling of the terminal.

The present invention provides an apparatus and a method by which the terminal is allocated with a plurality of CSI-RS measurement resources and receives the PDSCH by considering the plurality of CSI-RSs allocated in order to effectively apply the schemes of DS, DS/DB, JT, or CS/CB to the LTE-A system.

However, the present invention can be applied to various wireless communication systems in which a plurality of cells (base stations) cooperate with each other to transmit the data to the terminal located at the edge of the cell as well as the schemes of DS, DS/DB, JT, or CS/CB in the LTE-A system.

Figure 4:
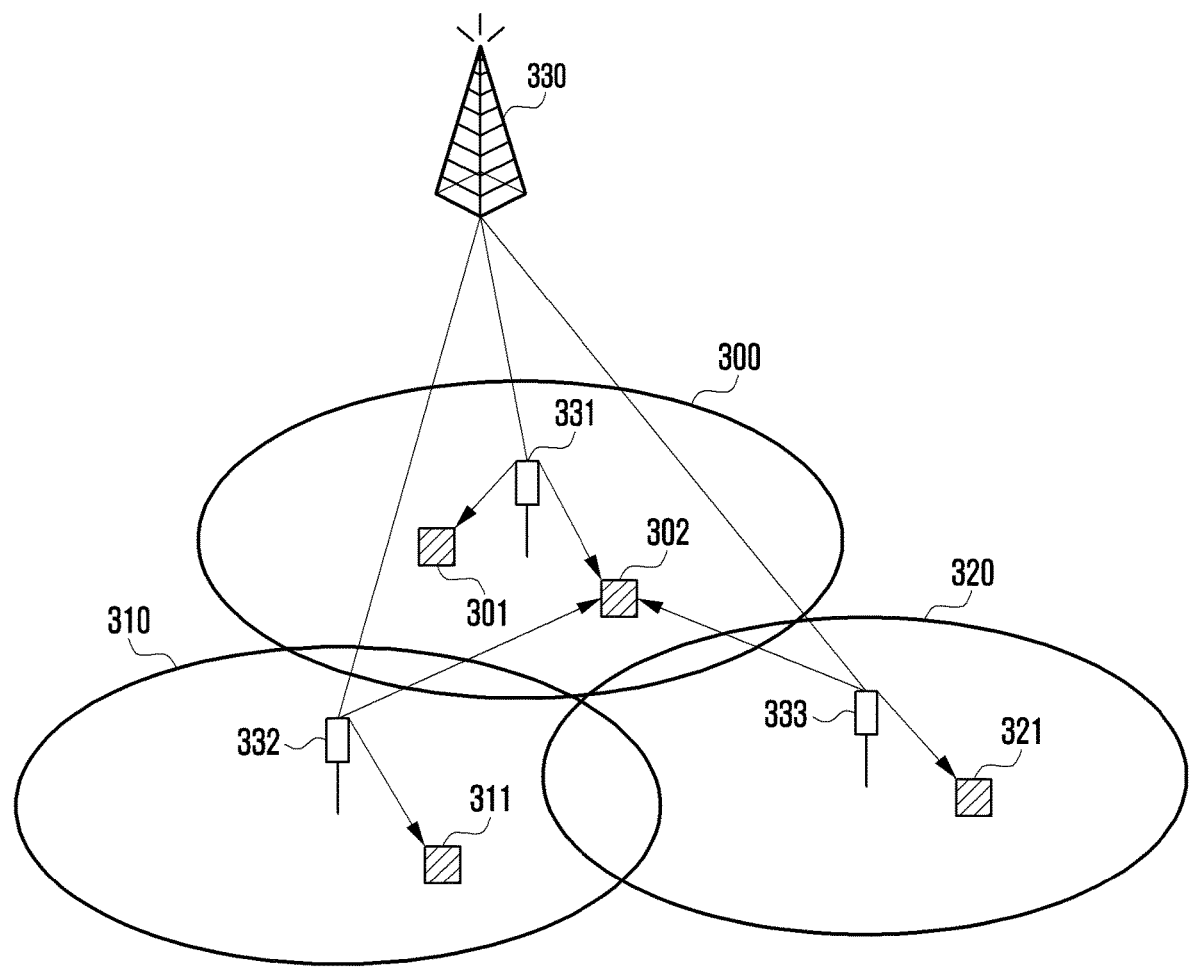
FIG. 4 schematically illustrates a structure of a cellular wireless communication system according to an embodiment of the present invention.

FIG. 4 schematically illustrates a structure of a cellular wireless communication system according to an embodiment of the present invention.

The description will be made on the assumption that the cellular wireless communication system of FIG. 4 is comprised of three cells 300, 310, and 320 for convenience of explanation. The cell defined in the embodiment of the present invention refers to a data transmission area where a specific transmission point can provide a service, and each transmission point may be a remote radio head (RRH) that has a cell-ID in common with a macro-base station in a macro-area, or the transmission points may be macro-cells or pico-cells, which have different cell-IDs.

In addition, a central control device in the embodiment of the present invention means a device, such as the base station, which can transmit/receive data to/from the terminal to process the transmitted/received data. Here, in the case where the transmission point is the RRH that has the cell-ID in common with the macro-base station, the macro-base station may be the central control device. In addition, in the case where the transmission points are macro-cells or pico-cells, which have different cell-IDs, a separate central control device may be defined to integrally manage the cells.

Referring to FIG. 4, the cellular wireless communication system may include one or more cells 300, 310, and 320, terminals 301, 311, and 321 that receive data from the nearest cell, and a terminal 302 that receives data from the cells 300, 310, and 320 through the CoMP transmission. The terminals 301, 311, and 321, which receive data from the nearest cell, may estimate channels through reference signals, i.e., the CSI-RSs, for channel estimation with respect to its own cell, and may transmit feedback information including the channel estimation result to the central control device 330. Reference numerals 331, 332, and 333 denote base stations (transmission points) of the cells 300, 310, and 320, respectively, and the base stations 331, 332, and 333 may communicate with the central control device 330.

However, in FIG. 4, the cell 302, which receives data transmitted from the three cells 300, 310, and 320 through the CoMP scheme, may estimate the channel status of each cell through the CSI-RS transmitted from each of the cells 300, 310, and 330, and may transmit feedback information including the channel estimation result to the central control device 330. That is, the central control device 330 may allocate three CSI-RS resources corresponding to the cells 300, 310, and 320 to the resource block transmitted to the terminal 302 for the channel estimation and the feedback information creation conducted by the terminal 302, and may receive the corresponding feedback information.

Here, the central control device 330 may perform the operation of determining the terminal operated through the CoMP, and the terminal operated through the non-CoMP.

That is, the central control device 330 may allocate a single CSI-RS resource for creating the channel feedback information to a specific terminal to allow the same to perform the non-CoMP operation, or may allocate two or more CSI-RS resources for creating the channel feedback information to a specific terminal to allow the same to perform the CoMP operation. Alternatively, the central control device 330 may add or remove the CSI-RS resources for the channel feedback information creation, by considering the CoMP operation of the mobile terminal.

To this end, the central control device 330 may collect downlink channel information from a plurality of cells around the terminal in a simple method, compared to the operation in which the terminal estimates the channel through the CSI-RS resources and creates the channel feedback information to be fed back.

In order to manage the CSI-RS resources for the channel feedback information creation, which are to be allocated to a specific terminal, the central control device 330 may allocate available CSI-RS resources to the terminal, and may let the terminal report the CSI-RS received power (CSI-RSRP) with respect to the allocated CSI-RS.

The terminal just measures the received strength of the CSI-RS in order to report the CSI-RSRP, so quite a low complexity of terminal measurement is required compared to the creation of the channel feedback information. In addition, since the CSI-RSRP varies in a long-term period rather than a short-term period, a separate report channel is not required, and the report may be included in the uplink data transmission to be transmitted as upper layer information in a long-term period.

As described above, a set including information on the resources allocated with one or more CSI-RSs for the CSI-RSRP report of the terminal, or a set including information on the cells corresponding to the CSI-RS resources may be defined as a CoMP resource management set. Hereinafter, the operation, in which the central control device allocates the resource management set including a plurality of CSI-RS resources, and the terminal performs the CSI-RSRP report in response thereto, will be described in detail with reference to FIGS. 5a and 5b.

Figure 5A:
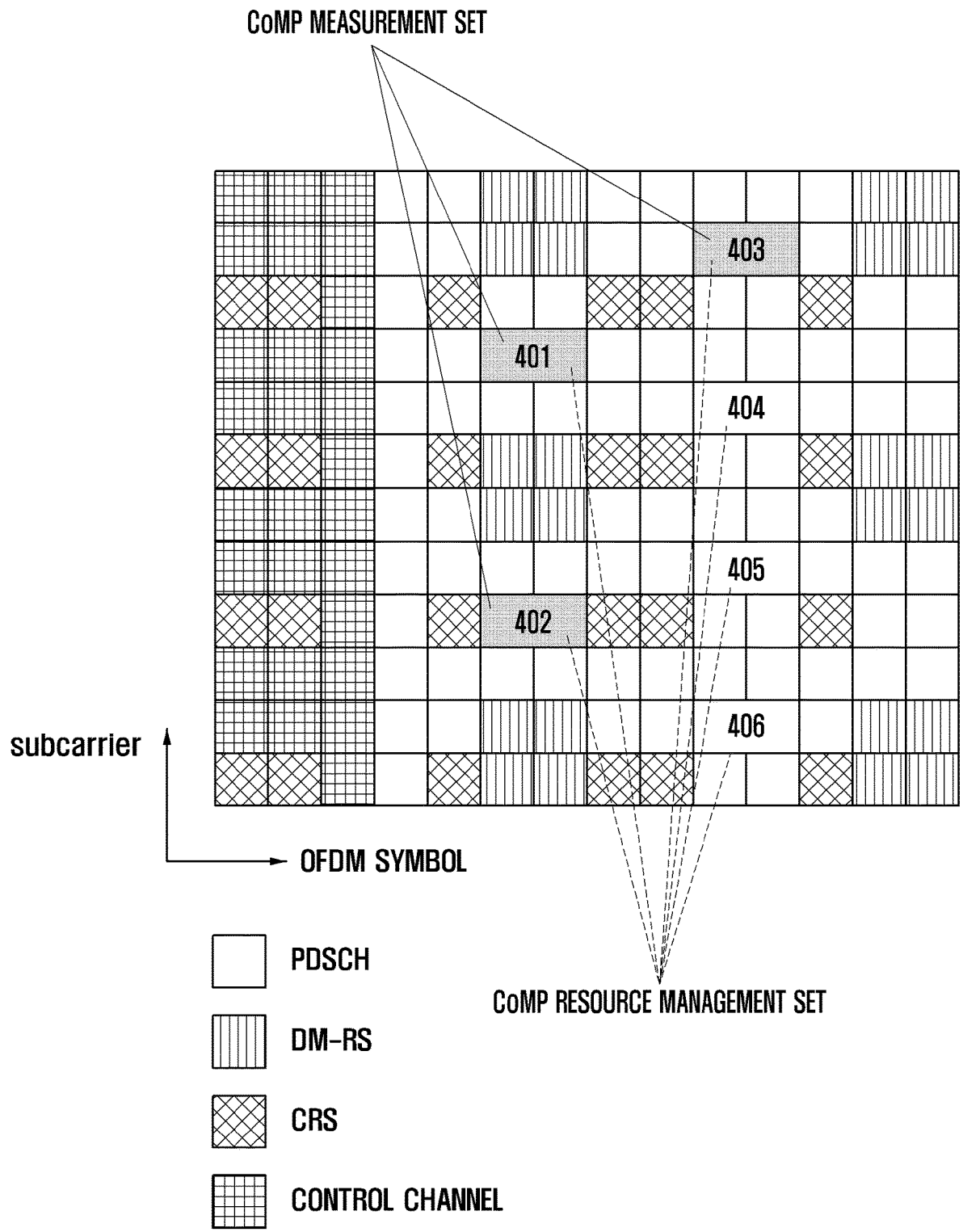
FIGS. 5a and 5b illustrate an example of the locations of CSI-RS resources that a central control device allocates to a resource block for creating and reporting of CSI-RSRP by a terminal, and a flowchart of the operation in which the central control device allocates a resource management set to the terminal and determines CSI-RS resources to be used for the channel estimation and the feedback creation of the terminal through the CSI-RSRP report, respectively, according to an embodiment of the present invention.

FIG. 5a illustrates an example of the locations of the CSI-RS resources that the central control device 330 allocates to a resource block for the CSI-RSRP creation and a report thereof by the terminal. The description of signals allocated to the resource block in FIG. 5a is the same as FIG. 3, and the detailed definition thereof conforms to the LTE-A system-related standard. In addition, FIG. 5b is a flowchart illustrating the operation in which the central control device 330 allocates the resource management set to the terminal and determines the CSI-RS resources to be used for the channel estimation and the feedback creation of the terminal through the CSI-RSRP report.

Referring to FIG. 5a, the central control device 330 may allocate the CSI-RS resources 401, 402, 403, 404, 405, and 406 for six cells near the terminal 302 to allow the terminal 302 to receive the CSI-RS resources corresponding to the six nearby cells so that the terminal 302, which receives the CoMP transmission, can measure the downlink power strength from a sufficient number of nearby cells. This corresponds to operation 510 of FIG. 5b.

That is, in order for the terminal 302 to create the CSI-RSRP for the nearby cells 300, 310, and 320 as shown in FIG. 4, the central control device may allocate the corresponding CSI-RS resources 401, 402, and 403, and may allocate the additional CSI-RS resources 404, 405, and 406 for other nearby cells (not shown) so that the terminal 302 can create the CSI-RSRP from a sufficient number of nearby cells to report the same to the central control device 330. In this case, the resource management set may be expressed as {401, 402, 403, 404, 405, 406} or an information set of the cells corresponding thereto.

Figure 5B:
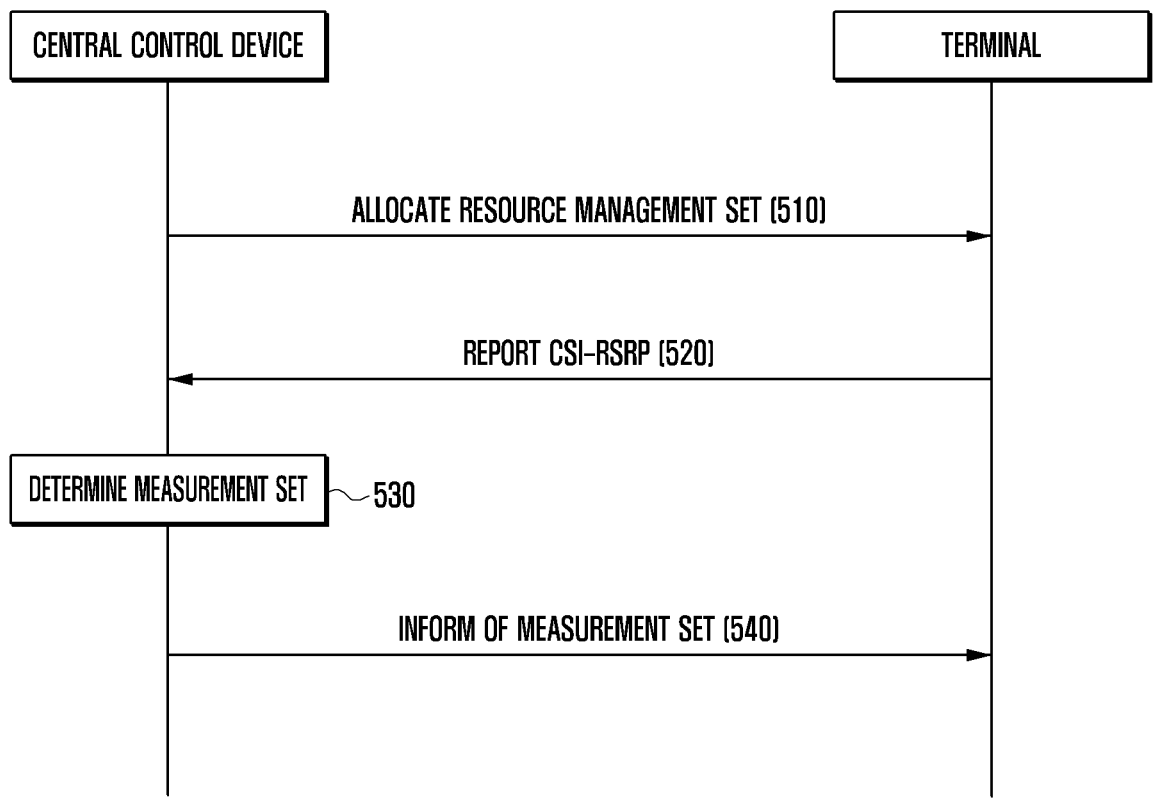

In operation 520 of FIG. 5b, the terminal may transmit the CSI-RSRP report to the central control device 330, and the central control device 330, which has identified CSI-RSRP values for the plurality of cells through the CSI-RSRP report of the terminal, may compare downlink received power values of the terminal for each cell to thereby determine the CSI-RS resource to be actually used for the channel estimation and the feedback creation of the terminal 302 in operation 530 of FIG. 5b. Afterwards, the central control device 330 informs the terminal of the determined CSI-RS resource in operation 540 of FIG. 5b.

For example, the central control device 330 may determine the cells, which have the CSI-RSRP values within a specific threshold based on the cell that has the maximum CSI-RSRP value, as the cells by which the terminal performs the channel estimation and the feedback creation, and may inform the terminal of the CSI-RS resources corresponding to the determined cells, as the resources for performing the channel estimation and the feedback creation. Here, the specific threshold may be in the range of about 6 dB to 10 dB, which can be determined properly according to the CoMP system.

In FIG. 5a, when the central control device 330 determines the resources 401, 402, and 403 as the CSI-RS resources for the channel estimation and the feedback creation of the terminal among the CSI-RS resources 401, 402, 403, 404, 405, and 406 allocated for the terminal 302 to report the CSI-RSRP, the central control device 330 may inform the terminal of the determined CSI-RS resources 401, 402, and 403. That is, the central control device 330 may inform the terminal of the CSI-RS resource 401 for the channel estimation and the feedback creation with respect to the cell 300, the CSI-RS resource 402 for the channel estimation and the feedback creation with respect to the cell 310, and the CSI-RS resource 403 for the channel estimation and the feedback creation with respect to the cell 320 so that the terminal 302 can estimate the channel and can create the feedback from the three cells 300, 310, and 320.

As described above, a set including one or more CSI-RS resources allocated for the channel estimation and the feedback information creation of each cell by the terminal, or a set including information on the cells corresponding to the CSI-RS resources may be defined as a CoMP measurement set. Accordingly, in the case mentioned above, the measurement set may be expressed as {401, 402, 403} or (300, 310, 320).

Although the CoMP measurement set is configured as a part of the CoMP resource management set in FIGS. 5a and 5b, the present invention is not limited thereto, and the CoMP measurement set may include separate CSI-RS resources that do not belong to the CoMP resource management set.

For example, when the central control device 330 determines that two specific cells are to be supported by the JT scheme after receiving the CSI-RSRP for the CSI-RS resources in the CoMP resource management set, the central control device may allocate separate CSI-RS resources with respect to the JT status of the corresponding two cells to request the channel feedback information.

As described above, the terminal may be allocated with a plurality of CSI-RS resources by the central control device 330, and the corresponding CSI-RS resources may belong to the CoMP resource management set, the CoMP measurement set, or both of them.

Hereinafter, the detailed description will be made of a method by which, in the case where the terminal is allocated with a plurality of CSI-RS resources according to the operation mentioned above, the central control device 330 maps a data symbol with the PDSCH transmission resource to transmit the same, and the terminal receives the PDSCH by considering the corresponding mapping method.

Embodiment 1

A method of simply defining the PDSCH transmission resource in the case of a plurality of CSI-RS resources allocated to the resource block is to define that the PDSCH is not transmitted to all of the time frequency resources allocated with the CSI-RS resources.

Figure 6:
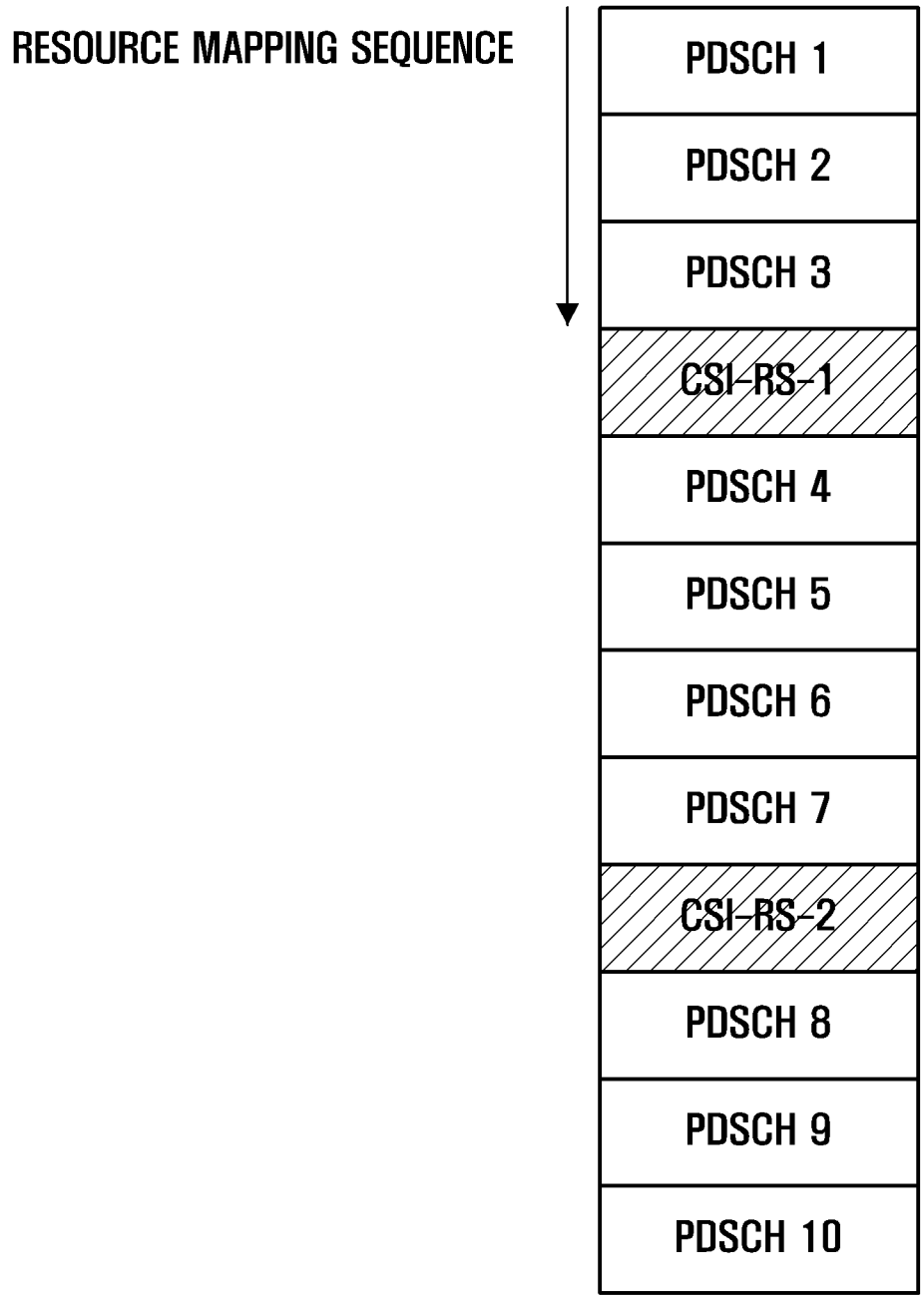
FIG. 6 illustrates Embodiment 1 for mapping data.

FIG. 6 illustrates Embodiment 1 in which PDSCH symbols are mapped. Referring to FIG. 6, the central control device may map the PDSCH symbols, i.e., the data, in an order of the index from the lowest one to the highest one such that the resource positions, where the CSI-RSs (CSI-RS-1, and CSI-RS-2) allocated to the terminal are mapped, are skipped, and the next PDSCH symbol is mapped with the next frequency resource. Here, the CSI-RSs (CSI-RS-1, and CSI-RS-2) allocated to the terminal may be the CSI-RSs corresponding to the resource management set mentioned above.

The method in which the PDSCH symbols are mapped in sequence while skipping specific resources may be referred to as a rate matching method. That is, the first method for defining the PDSCH transmission resource in the case where a plurality of CSI-RSs are allocated, is to apply the rate matching method to all of the CSI-RS resources regardless of whether the allocated CSI-RSs belong to the resource management set or the measurement set. According to this, the central control device does not perform the data mapping with respect to all of the CSI-RSs allocated only for the received power measurement of the terminal, which are included in the resource management set, but not in the measurement set.

Figure 7A:
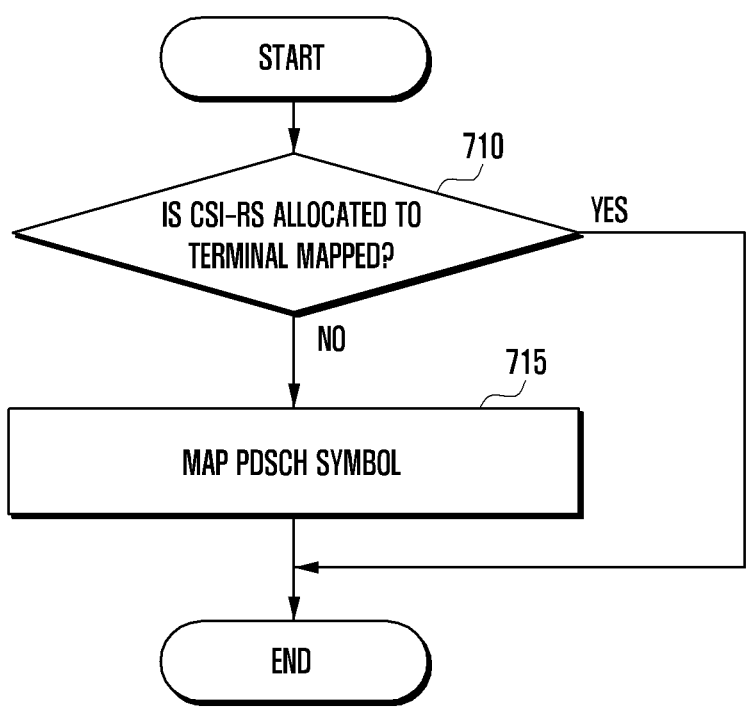
FIGS. 7a and 7b illustrate the PDSCH resource mapping operation in which a rate matching method is applied to all of the CSI-RS resources allocated to the terminal according to Embodiment 1.
Figure 7B:
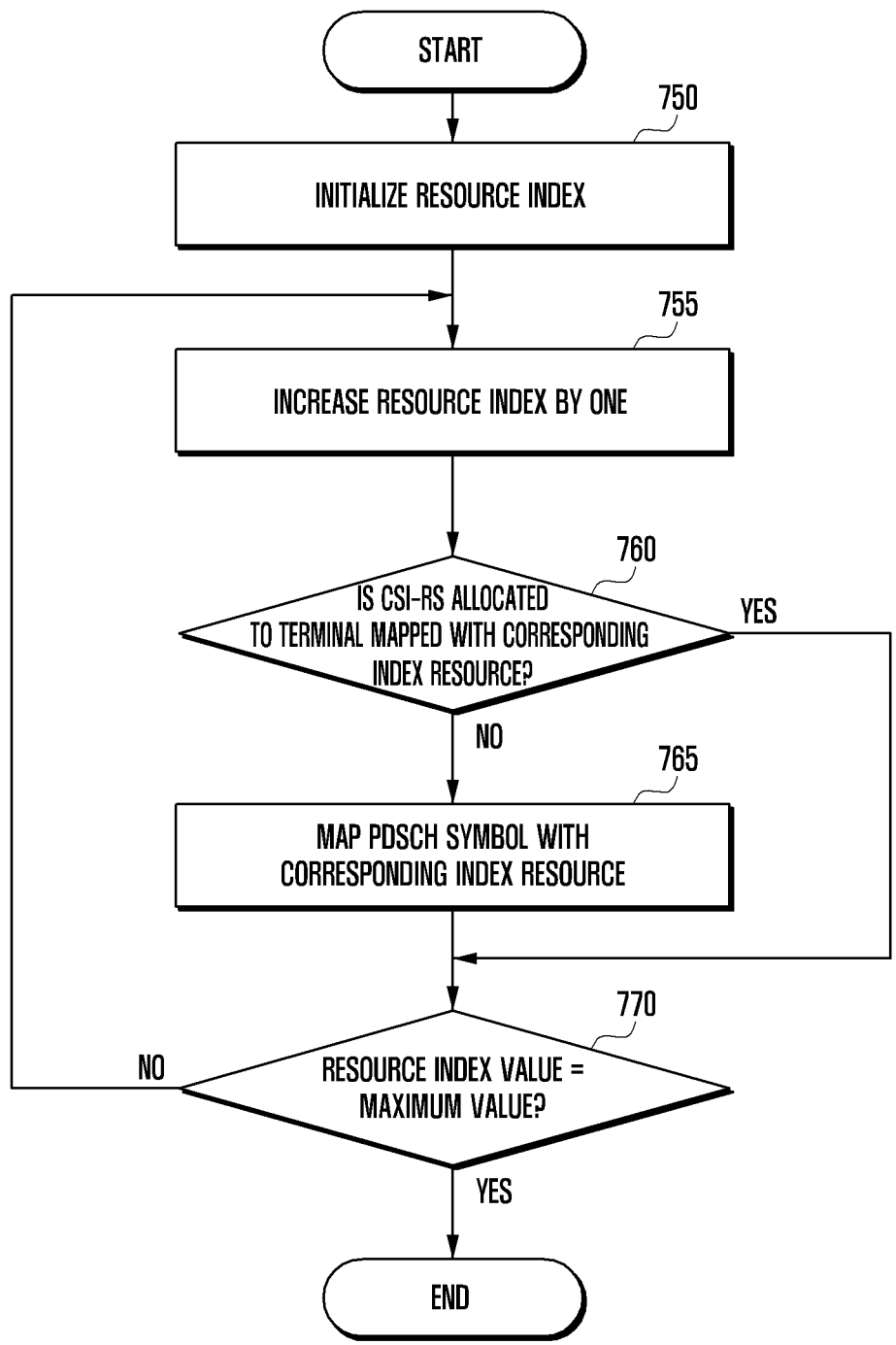

FIGS. 7a and 7b illustrate the PDSCH resource mapping operation in which the rate matching method is applied to all of the CSI-RS resources allocated to the terminal according to Embodiment 1.

First, referring to FIG. 7a, in operation 710, the central control device may determine whether or not the CSI-RS allocated to the terminal is mapped with the resource position where the PDSCH symbol is to be mapped in the resource block. As a result of the determination, if the allocated CSI-RS is not mapped with the corresponding position, the central control device may map the PDSCH symbol with the corresponding position in operation 715, and if the CSI-RS allocated to the terminal is mapped therewith, the central control device may not map the PDSCH symbol with the corresponding position.

Next, the above-mentioned operation will be described in more detail with reference to FIG. 7b. First, the central control device may initialize the resource index as zero to start PDSCH resource mapping with respect to a specific terminal in operation 750. In the case where the resource index starts from 1, the resource index is initialized as zero, but the present invention is not limited thereto, and if the PDSCH resource index starts from a natural number "n," the resource index may be initialized as "n−1."

Next, the central control device may increase the resource index by one in operation 755, and may identify whether or not the CSI-RS allocated to the terminal is mapped with the corresponding index resource in operation 760.

If the CSI-RS allocated to the terminal is determined to be mapped with the corresponding index resource in operation 760, the central control device may not map the PDSCH symbol with the corresponding index resource, and may proceed to operation 770 to check whether or not the resource index value is maximum, that is, whether or not all of the index resources have been mapped with the PDSCH symbols. As a result of the checking, if the current resource index is the last one, the PDSCH mapping is finished. Otherwise, the central control device may return to operation 755.

If it is determined that the CSI-RS allocated to the terminal is not mapped with the corresponding index resource in operation 760, the central control device may proceed to operation 765 to thereby map the PDSCH symbol with the corresponding index resource, and may check whether or not the current index is the last resource index in operation 770. As a result of the checking, if the current resource index is the last one, the PDSCH mapping is finished. Otherwise, the central control device may return to operation 755.

Although FIG. 7b shows that the central control device determines whether or not the CSI-RS is mapped with the current index resource while increasing the resource index in sequence, the present invention is not limited thereto, and the central control device may obtain CSI-RS mapping information on all of the index resources before the PDSCH mapping, and may perform the PDSCH mapping with respect to the remaining resources except for all of the indexes mapped with the CSI-RSs.

The terminal that receives the PDSCH data-mapped according to the mapping operation of Embodiment 1 set forth above may restore the PDSCH data on the assumption that the central control device uses the resource mapping method according to Embodiment 1.

Embodiment 2

As the second method for defining the PDSCH transmission resource in the case of a plurality of CSI-RS resources allocated to the resource block transmitted to the terminal, the rate matching method mentioned above may be applied to the CSI-RS resources included in the CoMP measurement set, and the PDSCH symbols may be mapped with the positions of the CSI-RS resources that are not included in the CoMP measurement set.

Figure 8:
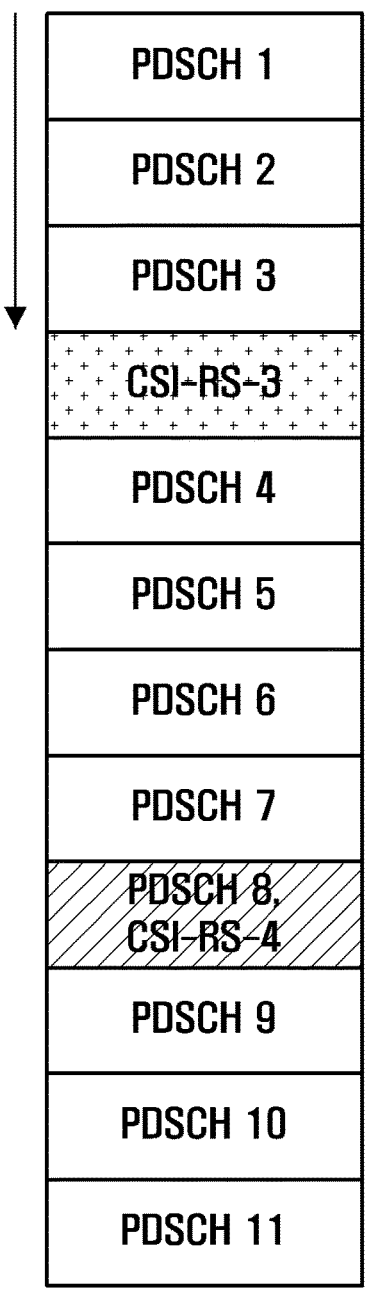
FIG. 8 illustrates Embodiment 2 for mapping data.
Figure 8:
Figure 8:

FIG. 8 illustrates Embodiment 2 for mapping the PDSCH symbols. Referring to FIG. 8, the central control device may map the PDSCH symbols in an order of the index from the lowest one to the highest one, and if a specific index resource corresponds to the CSI-RS resource (CSI-RS-3) allocated to the terminal and belongs to the CoMP measurement set, may skip the PDSCH symbol mapping with respect to the corresponding resource so that the next PDSCH symbol is mapped with the next frequency resource.

On the contrary, if the time frequency resource of a specific index corresponds to the CSI-RS resource (CSI-RS-4) allocated to the terminal, but does not belong to the CoMP measurement set, the central control device may map the PDSCH symbol with the corresponding index resource as well regardless of the CSI-RS allocation.

As set forth above, in the case of the resource defined to be mapped with both the CSI-RS and the PDSCH, the terminal may simultaneously perform the CSI-RS channel estimation and the PDSCH reception in the corresponding resource, or may perform the CSI-RS channel estimation in the corresponding resource while performing the decoding on the assumption that the corresponding resource value is zero for the PDSCH reception. The method for decoding on the assumption that the corresponding resource value is zero may be referred to as puncturing.

Figure 9A:
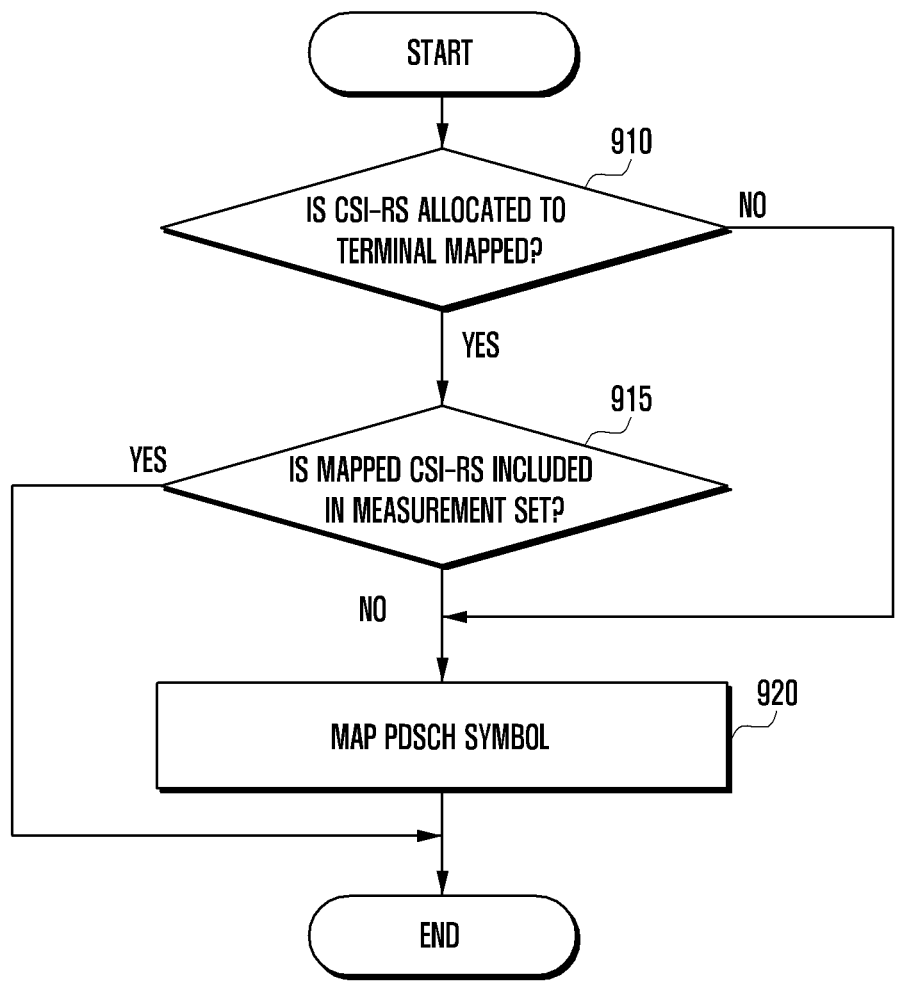
FIGS. 9a and 9b illustrate the operation in which the CSI-RS resources, which are included in a CoMP measurement set, among the allocated CSI-RS resources, are applied with the rate matching, and the CSI-RS resources, which are not include therein, are applied with the PDSCH mapping according to Embodiment 2.
Figure 9B:
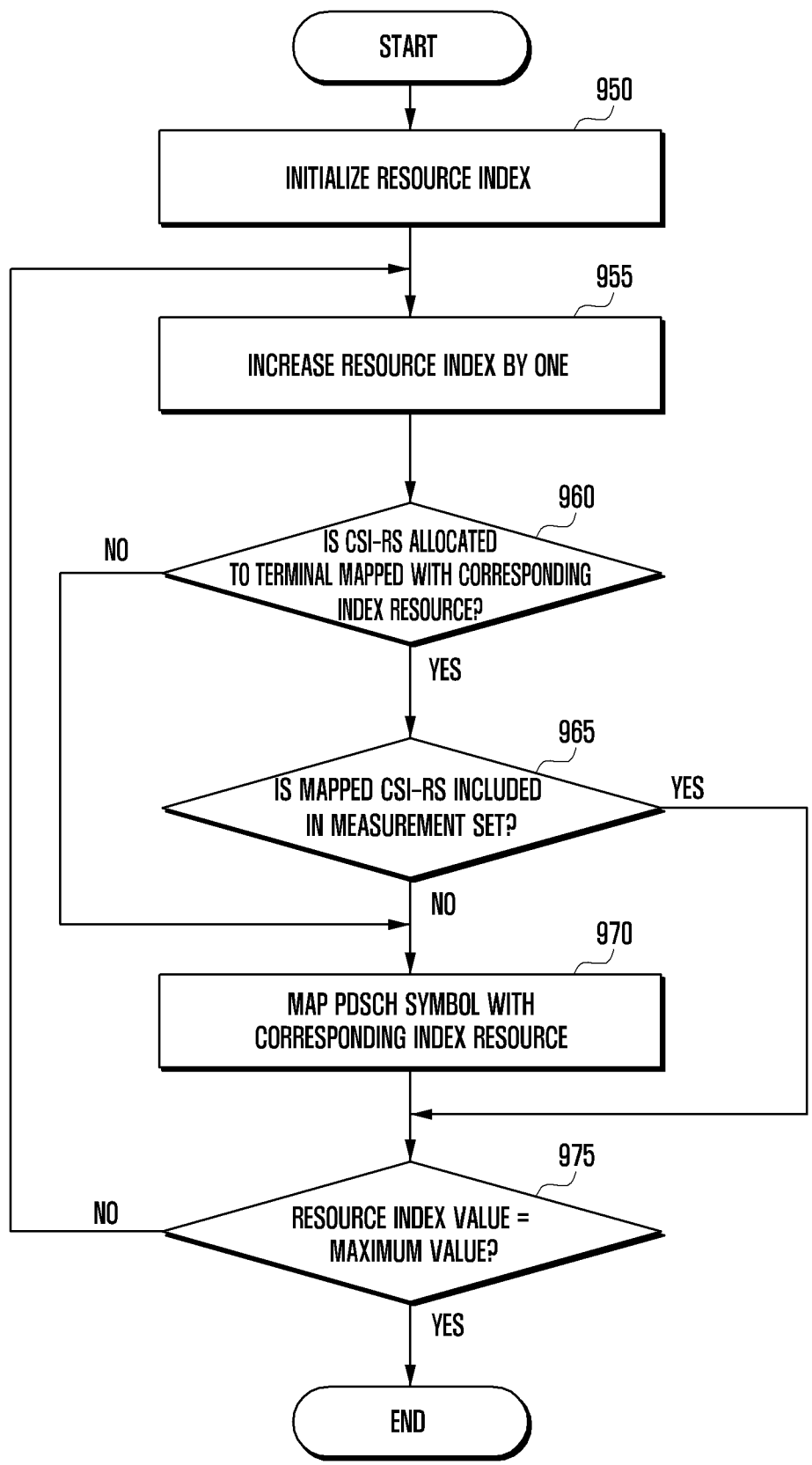

FIGS. 9a and 9b illustrate the operation in which the CSI-RS resources, which are included in the CoMP measurement set, among the CSI-RS resources allocated to the terminal, are applied with the rate matching, and the CSI-RS resources, which are not include therein, are applied with the PDSCH mapping according to Embodiment 2.

First, referring to FIG. 9a, in operation 910, the central control device may determine whether or not the CSI-RS allocated to the terminal is mapped with the resource position where the PDSCH symbol is to be mapped in the resource block. As a result of the determination, if the CSI-RS allocated to the terminal is not mapped with the corresponding position, the central control device may map the PDSCH symbol with the corresponding position in operation 920.

If it is determined that the CSI-RS allocated to the terminal is mapped with the corresponding position in operation 910, the central control device may determine whether or not the mapped CSI-RS is included in the CoMP measurement set in operation 915. As a result of the determination, if the mapped CSI-RS is not included in the CoMP measurement set, the central control device may map the PDSCH symbol with the corresponding position in operation 920.

Meanwhile, if it is determined that the mapped CSI-RS is included in the CoMP measurement set in operation 915, the central control device may not map the PDSCH symbol with the corresponding position.

Next, the operation above will be described in more detail with reference to FIG. 9b. First, the central control device may initialize the resource index as zero to start the PDSCH resource mapping with respect to the terminal in operation 950. In the case where the resource index starts from 1, the resource index is initialized as zero, but the present invention is not limited thereto, and if the PDSCH resource index starts from a natural number "n," the resource index may be initialized as "n−1."

Next, the central control device may increase the resource index by one in operation 955, and may check whether or not the CSI-RS allocated to the terminal is mapped with the corresponding index resource in operation 960.

If it is determined that the CSI-RS allocated is not mapped with the corresponding index resource in operation 960, the central control device may proceed to operation 970 to thereby map the PDSCH symbol with the corresponding index resource, and may check whether or not the current resource index is the last one in operation 975. As a result of the checking, if the current resource index is the last one, the PDSCH mapping is finished. Otherwise, the central control device may return to operation 955.

On the contrary, if it is determined that the CSI-RS allocated to the terminal is mapped with the corresponding index resource in operation 960, the central control device may proceed to operation 965 to thereby check whether or not the CSI-RS mapped with the current index resource is included in the CoMP measurement set.

If it is determined that the mapped CSI-RS is included in the CoMP measurement set in operation 965, the central control device may not map the PDSCH symbol with the corresponding index resource, and may check whether or not the current resource index is the last one in operation 975. If the current resource index is the last one, the PDSCH mapping is finished. Otherwise, the central control device may return to operation 955.

If it is determined that the mapped CSI-RS is not included in the CoMP measurement set in operation 965, the central control device may proceed to operation 970 to thereby map the PDSCH symbol with the corresponding index resource, and may checks the last resource index in operation 975. If the resource index is the last one, the PDSCH mapping is finished. Otherwise, the central control device may return to operation 955.

Although FIG. 9b shows that the central control device determines whether or not the CSI-RS is mapped with the current index resource and whether or not the CSI-RS is included in the CoMP measurement set while increasing the resource index in sequence, the present invention is not limited thereto, and the central control device may obtain CSI-RS mapping information on all of the index resources before the PDSCH mapping, and may perform the PDSCH mapping with respect to the remaining resources except for all of the indexes mapped with the CSI-RS.

The terminal that receives the resource block mapped with the PDSCH symbol according to the mapping operation of Embodiment 2 set forth above may restore the PDSCH data on the assumption that the central control device uses the resource mapping method according to Embodiment 2.

Hereinafter, the operation, in which the terminal receives information on the CoMP measurement set from the central control device to restore the PDSCH data according to Embodiment 2, will be described in detail.

According to Embodiment 2, if the resource management set, which is a CSI-RS information set transmitted from the central control device to the terminal, is {CSI-RS-1, CSI-RS-2, CSI-RS-3, CSI-RS-4, CSI-RS-5}, and CSI-RS-1 and CSI-RS-2 are included in the CoMP measurement set, but CSI-RS-3, CSI-RS-4, and CSI-RS-5 are not included in the CoMP measurement set, the PDSCH is not transmitted in the time frequency resource through which CSI-RS-1 and CSI-RS-2 are transmitted, while the rate matching is applied thereto, but the PDSCH symbol is mapped with the corresponding resource to be transmitted with respect to the remaining CSI-RS-3, CSI-RS-4, and CSI-RS-5 regardless of the mapped CSI-RS.

Accordingly, in order to apply Embodiment 2 of the present invention, it is required to share information on whether or not a specific CSI-RS is included in the CoMP measurement set between the central control device and the terminal.

In the LTE-A system, the central control device transfers CSI-RS reception information to the terminal using an RRC signal. The CSI-RS reception information included in the RRC signal may include one or more pieces of the following information.

CSI-RS Reception Information:
csi-RS-Identity: Index of corresponding CSI-RS
antennaPortsCount: Number of antenna ports of corresponding CSI-RS
resourceConfig: Position of corresponding CSI-RS in resource block shown in FIG. 3
subframeConfig: Transmission timing information on corresponding CSI-RS shown in Table 1
scramblingIdentity: Sequence creation information on corresponding CSI-RS That is, when the terminal identifies one of the RRC information sets, one CSI-RS is defined according thereto, and when the terminal receives a plurality of RRC information sets, a plurality of CSI-RSs, which are different from each other, may be allocated.

Meanwhile, the central control device may allocate additional resources for measuring the interference to the terminal in addition to the CSI-RS allocation for the channel estimation and the feedback information creation. The amount of data per hour, which the terminal can receive, may be affected by the interference strength as well as the signal strength. Therefore, in order for the terminal to accurately measure the interference, the central control device may additionally allocate one or more separate interference measurement resources (or CSI-IM) that enable the terminal to measure only the interference.

That is, the central control device may allocate a single CSI-IM to a single terminal so that the terminal can measure the interference applied in common to a signal component with respect to the CSI-RS used for the feedback creation, or may allocate a plurality of CSI-IMs to a single terminal so that the terminal measure various pieces of interference. Like the CSI-RS allocation, the central control device may transfer CSI-IM reception information to the terminal using the RRC signal in the LTE-A system. The CSI-IM reception information included in the RRC signal may include one or more pieces of the following information.

CSI-IM Reception Information:
csi-im-Identity: Index of corresponding CSI-IM
resourceConfig: Position of corresponding CSI-IM in resource block shown in FIG. 3
subframeConfig: Transmission timing information on corresponding CSI-IM shown in Table 1

That is, when the terminal identifies one RRC information set, one CSI-IM is defined according thereto, and when the terminal receives a plurality of RRC information sets, a plurality of CSI-IMs, which are different from each other, may be allocated.

As described above, if the terminal is allocated with one or more CSI-RSs, or one or more CSI-IMs, the feedback information on the specific cell and the interference status can be defined. The feedback allocation may be performed using the RRC signal as well in the LTE-A system.

The unit, in which the base station allocates the feedback to the terminal, is referred to as a CSI process, and a single CSI process is related to a single CSI-RS and a single CSI-IM. In the LTE-A signal, CSI process allocation information, which is feedback allocation information included in the RRC signal, may include at least one piece of the following information.

CSI Process Reception Information:
csi-Process-Identity: Index of corresponding CSI process
csi-RS-Identity: Index of CSI-RS to be used as channel information on feedback creation
csi-IM-Identity: Index of CSI-IM to be used as interference information on feedback creation
Pc: Power scaling information to be considered when creating feedback
CodebookSubsetRestrictions: Pre-coding information to be considered when creating feedback That is, when the terminal identifies one RRC information set, one CSI process is defined, and the terminal is notified that one piece of feedback information is to be created. When the terminal receives a plurality of RRC information sets, the terminal is allocated with a plurality of CSI processes, which are different from each other, and a plurality of pieces of feedback corresponding thereto.

Here, as the first method for the central control device and the terminal to share the information on whether or not a specific CSI-RS is included in the CoMP measurement set, since the CSI-RSs referred to in one or more CSI processes allocated from the central control device, i.e., the CSI-RSs included in the feedback allocation information received from the central control device, are used in creating the channel feedback, the terminal may determine that the CSI-RSs are included in the CoMP measurement set, whereas since the CSI-RSs, which are not referred to in the allocated CSI processes, are not used in creating the channel feedback, the terminal may determine that the CSI-RSs are not included in the CoMP measurement set.

For example, the set of CSI-RSs allocated to the terminal through the RRC signal may be {CSI-RS-1, CSI-RS-2, CSI-RS-3, CSI-RS-4, CSI-RS-5}, and the terminal may be allocated with a single CSI-IM from the central control device. In addition, the terminal may be allocated with three CSI processes for the feedback allocation as shown in Table 2 below.

TABLE 2

|  | Signal Component | Interference |
| --- | --- | --- |
| CSI process 1 | CSI-RS-1 | IMR |
| CSI process 2 | CSI-RS-2 | IMR |
| CSI process 3 | CSI-RS-3 | IMR |

According to Table 2, the terminal may identify that CSI-RS-1, CSI-RS-2, and CSI-RS-3, which are referred to in the CSI process allocation, are included in the CoMP measurement set, and may determine that CSI-RS-4 and CSI-RS-5 are not included in the CoMP measurement set so that the rate matching is not applied to CSI-RS-4 and CSI-RS-5 in the PDSCH mapping.

That is, when using the method by which it is determined whether or not the CSI-RS is included in the CoMP measurement set according to whether or not the CSI-RS is referred to in the CSI processes allocated to the terminal, operation 915 of FIG. 9a and operation 960 of FIG. 9b may have the same meaning as "Is the mapped CSI-RS referred to in at least one of the CSI processes allocated to the terminal?" or "Is the mapped CSI-RS information included in the feedback allocation information received by the terminal?"

For more information, in order to apply the method, in which the inclusion of the mapped CSI-RS in the CoMP measurement set is determined according to whether or not the mapped CSI-RS is referred to in the CSI processes, to LTE Release 10 CSI-RS that cannot be included in the CSI process allocation, it may be defined that Release 10 CSI-RS is always included in the CoMP measurement set.

As another method for the central control device and the terminal to share the information on whether or not a specific CSI-RS is included in the CoMP measurement set, the central control device may include control information, which directly indicates whether or not the corresponding CSI-RS is included in the CoMP measurement set, in the RRC signal for the CSI-RS configuration, which is transmitted to the terminal. In this case, the RRC signal information including the CSI-RS reception information may be modified as follows.

CSI-RS Reception Information:
csi-RS-Identity: Index of corresponding CSI-RS
antennaPortsCount: Number of antenna ports of corresponding CSI-RS
resourceConfig: Position of corresponding CSI-RS in resource block shown in FIG. 3
subframeConfig: Transmission timing information on corresponding CSI-RS shown in Table 1
scramblingIdentity: Sequence creation information on corresponding CSI-RS
CoMPmeasurementSet: Information on inclusion in CoMP measurement set (control information)

That is, the terminal may identify whether or not the corresponding CSI-RS is included in the CoMP measurement set according to the configuration of the CoMPmeasurementSet information in the RRC information above, and may determine that the PDSCH resources mapping has been made according to the operation of FIGS. 9a and 9b.

For more information, the CoMPmeasurementSet information cannot be included in the CSI-RS configuration up to LTE Release 11 that has already been defined, it may be defined to always be included in the CoMP measurement set with respect to Release 10 or Release 11 CSI-RSs.

As the third method for the central control device and the terminal to share the information on whether or not a specific CSI-RS is included in the CoMP measurement set, apart from the CSI-RS configuration, the RRC signal that configures the CoMP measurement set and the CoMP resource management set may be defined.

That is, the RRC signal including the following control information may be newly defined separately from the CSI-RS configuration.

CoMP Resource Management Set Information:
csi-RS-Identity: Index of CSI-RS included in CoMP resource management set CoMP Measurement Set Information:
  csi-RS-Identity: Index of CSI-RS included in CoMP resource management set In the case of applying this method, the terminal may identify the CSI-RS included in the CoMP measurement set through the RRC signal, and may identify the PDSCH resource mapping method by applying the operation of FIGS. 9a and 9b.

According to Embodiment 2 of the present invention set forth above, the PDSCH symbol is mapped by considering only the CSI-RSs included in the CoMP measurement set regardless of other CSI-RSs except for the same because the PDSCH is not directly transmitted in the cell related to the CSI-RS that does not involve the channel estimation and the feedback due to a lack of downlink channel information, so applying the rate matching to the corresponding resource may bring about a waste of data resources. In addition, that is because, since the CSI-RS is transmitted through the overall frequency areas even without applying the rate matching, although the CSI-RS is partially transmitted together with the PDSCH, the downlink power measurement may not be affected so much.

Embodiment 3

As the third method for defining the PDSCH transmission resource in the case of a plurality of CSI-RS resources allocated to the resource block transmitted to the terminal, the central control device may directly configure whether or not the rate matching is applied to a specific CSI-RS resource using the RRC signal, and may determine the PDSCH resource mapping according thereto.

Figure 10:
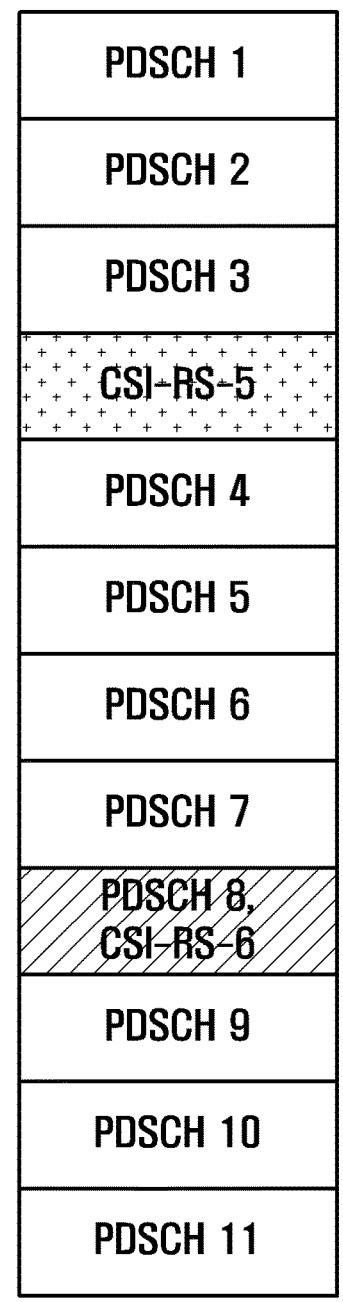
FIG. 10 illustrates Embodiment 3 for mapping data.
Figure 10:
Figure 10:

FIG. 10 illustrates Embodiment 3 for mapping the PDSCH symbols. Referring to FIG. 10, the central control device may map the PDSCH symbols in an order of the index from the lowest one to the highest one, and if a specific index resource corresponds to the CSI-RS resource (CSI-RS-5) allocated to the terminal and if the CSI-RS is configured to apply the rate matching through the RRC signal, the central control device may skip the PDSCH symbol mapping with respect to the corresponding index resource so that the next PDSCH symbol is mapped with the next frequency resource.

On the contrary, if the time frequency resource of a specific index corresponds to the CSI-RS resource (CSI-RS-6) allocated to the terminal, but if the CSI-RS is not configured to apply the rate matching through the RRC signal, the central control device may map the PDSCH symbol with the corresponding index resource regardless of the CSI-RS allocation.

As set forth above, in the case of the resource defined to be mapped with both the CSI-RS and the PDSCH, the terminal may simultaneously perform the CSI-RS channel estimation and the PDSCH reception in the corresponding resource, or may perform the CSI-RS channel estimation in the corresponding resource while performing the decoding on the assumption that the corresponding resource value is zero for the PDSCH reception. The method for decoding on the assumption that the corresponding resource value is zero may be referred to as puncturing.

Figure 11A:
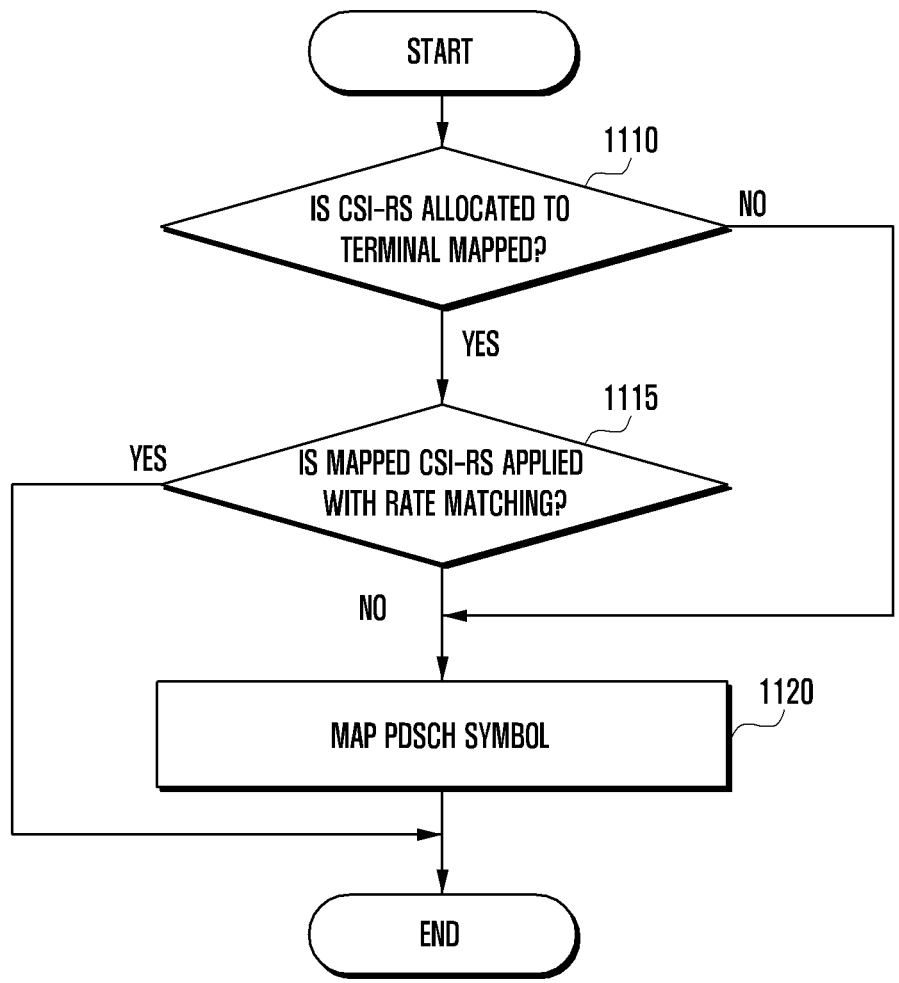
FIGS. 11a and 11b illustrate the operation in which the application of the rate matching with respect to the CSI-RS resources allocated to the terminal is directly configured through an RRC signal according to Embodiment 3.
Figure 11B:
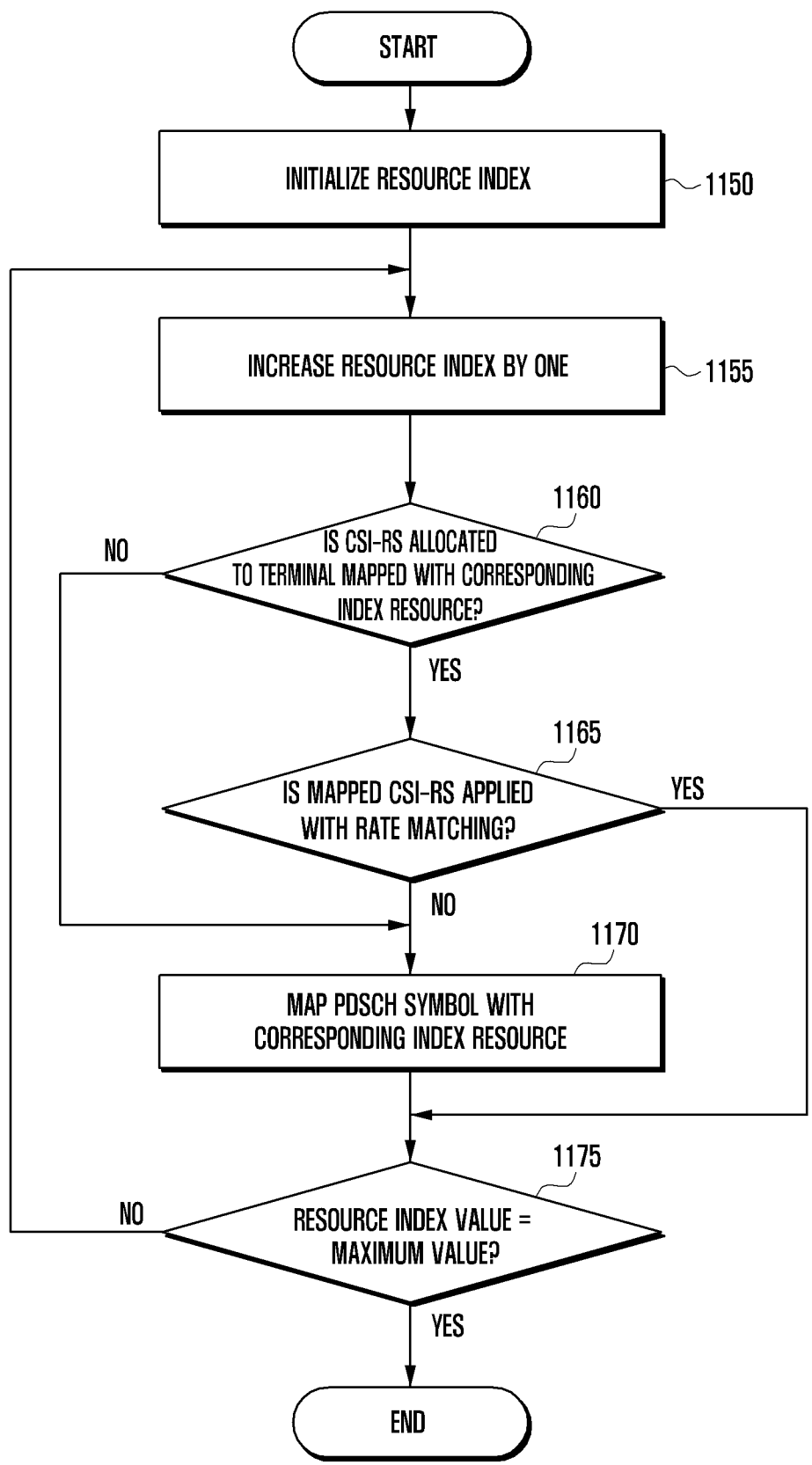

FIGS. 11a and 11b illustrate an example in which application of the rate matching with respect to the CSI-RS resources allocated to the terminal is directly configured through the RRC signal according to Embodiment 3.

First, Referring to FIG. 11a, in operation 1110, the central control device may determine whether or not the CSI-RS allocated to the terminal is mapped with the resource position where the PDSCH symbol is to be mapped in the resource block. As a result of the determination, if the CSI-RS allocated to the terminal is mapped with the corresponding position, the central control device may determine whether or not the rate matching is applied to the mapped CSI-RS in operation 1115.

As a result of the determination in operation 1115, if it is determined that the rate matching is not applied to the mapped CSI-RS, the central control device may map the PDSCH symbol with the corresponding position in operation 1120, and if it is determined that the rate matching is applied to the mapped CSI-RS, the central control device may not map the PDSCH symbol with the corresponding position.

Next, the operation above will be described in more detail with reference to FIG. 11b. First, the central control device may initialize the resource index as zero to start the PDSCH resource mapping with respect to a specific terminal in operation 1150. In the case where the resource index starts from 1, the resource index is initialized as zero, but the present invention is not limited thereto, and if the PDSCH resource index starts from a natural number "n," the resource index may be initialized as "n−1."

Next, the central control device may increase the resource index by one in operation 1155, and may check whether or not the CSI-RS allocated to the terminal is mapped with the corresponding index resource in operation 1160.

If it is determined that the CSI-RS is not mapped with the corresponding index resource in operation 1160, the central control device may proceed to operation 1170 to thereby map the PDSCH symbol with the corresponding index resource, and may check whether or not the current resource index is the last one in operation 1175. As a result of the checking, if the current resource index is the last one, the PDSCH mapping is finished. Otherwise, the central control device may return to operation 1155.

On the contrary, if it is determined that the CSI-RS is mapped with the corresponding index resource in operation 1160, the central control device may proceed to operation 1165 to thereby determine whether or not the CSI-RS mapped with the corresponding index resource is configured to apply the rate matching.

If it is determined that the corresponding CSI-RS is configured to apply the rate matching in operation 1165, the central control device may not map the PDSCH symbol with the corresponding index resource, and may check whether or not the current resource index is the last one in operation 1175. If the current resource index is the last one, the PDSCH mapping is finished. Otherwise, the central control device may return to operation 1155.

If it is determined that the corresponding CSI-RS is configured not to apply the rate matching in operation 1165, the central control device may proceed to operation 1170 to thereby map the PDSCH symbol with the corresponding index resource, and may checks the last resource index in operation 1175. If the resource index is the last one, the PDSCH mapping is finished. Otherwise, the central control device may return to operation 1155.

Although FIG. 11b shows that the central control device determines whether or not the CSI-RS is mapped with the current index resource and whether or not the rate matching is applied thereto while increasing the resource index in sequence, the present invention is not limited thereto, and the central control device may obtain CSI-RS mapping information on all of the index resources before the PDSCH mapping, and may perform the PDSCH mapping with respect to the remaining resources except for all of the indexes mapped with the CSI-RS applied with the rate matching.

The terminal that receives the resource block mapped with the PDSCH symbol according to the mapping operation of Embodiment 3 set forth above may restore the PDSCH data on the assumption that the central control device uses the resource mapping method according to Embodiment 3.

According to Embodiment 3, if the CSI-RS set received by the terminal from the central control device is {CSI-RS-1, CSI-RS-2, CSI-RS-3, CSI-RS-4, CSI-RS-5}, and CSI-RS-1 and CSI-RS-2 are configured to apply the rate matching through the RRC signal, but CSI-RS-3, CSI-RS-4, and CSI-RS-5 are configured not to apply the rate matching, the PDSCH is not transmitted in the time frequency resource through which CSI-RS-1 and CSI-RS-2 are transmitted, while the rate matching is applied thereto, but the PDSCH symbol is mapped with the corresponding resource to be transmitted with respect to the remaining CSI-RS-3, CSI-RS-4, and CSI-RS-5 regardless of the mapped CSI-RS.

Accordingly, in order to apply Embodiment 3 of the present invention, it is required to share information on whether or not the rate matching is applied to a specific CSI-RS between the central control device and the terminal.

As mentioned above, in the LTE-A system, the central control device transfers the CSI-RS reception information to the terminal using the RRC signal. As an example of sharing information on whether or not the rate matching is applied to a specific CSI-RS between the central control device and the terminal, according to Embodiment 3 of the present invention, the central control device may transmit an RRC signal including rate matching information on the configuration of application of the rate matching in the RRC signal allocating the CSI-RS to thereby transfer the same to the terminal. At this time, the CSI-RS reception information may include the following information.

CSI-RS Reception Information:
csi-RS-Identity: Index of corresponding CSI-RS
antennaPortsCount: Number of antenna ports of corresponding CSI-RS
resourceConfig: Position of corresponding CSI-RS in resource block shown in FIG. 3
subframeConfig: Transmission timing information on corresponding CSI-RS shown in Table 1
scramblingIdentity: Sequence creation information on corresponding CSI-RS
rateMatching: Application of rate matching of corresponding CSI-RS (rate matching information)

That is, the terminal may identify whether or not the rate matching is applied to the corresponding CSI-RS according to the configuration of the rateMatching information in the RRC information above to thereby determine the PDSCH resources mapping according to the operation of FIG. 11.

For more information, the rateMatching information cannot be included in the CSI-RS configuration up to LTE Release 11 that has already been defined, it may be defined that the rate matching is always applied with respect to Release 10 or Release 11 CSI-RSs.

According to Embodiment 3 of the present invention set forth above, the central control device may separately configure the rate matching of the CSI-RS, so the base station may control the data resource utilization and the accuracy of the CSI-RSRP by itself.

Figure 12:
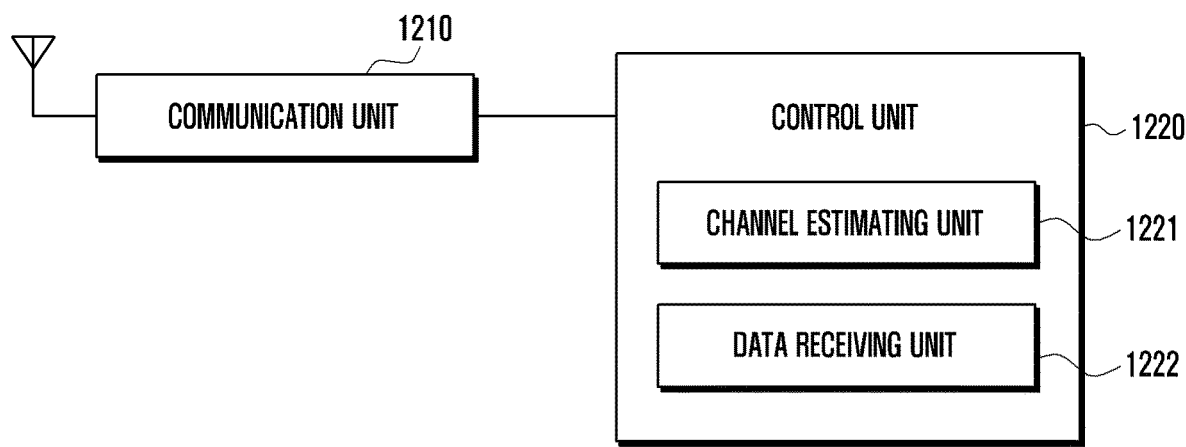
FIG. 12 illustrates a configuration of a downlink data receiving device, i.e., the terminal according to an embodiment of the present invention.

FIG. 12 illustrates a configuration of a downlink data receiving device, i.e., the terminal according to an embodiment of the present invention.

Referring to FIG. 12, the terminal may include a communication unit 1210 and a control unit 1220.

The communication unit 1210 transmits or receives data to or from the outside. Here, the communication unit 1210 may estimate the channel through the CSI-RS allocated from the central control device, and may further measure the feedback information or the power strength, under the control of the control unit 1220, to thereby transmit information thereon to the central control device. In addition, the communication unit 1210 may identify the resources positions for data and additional channels, and may restore the data.

The control unit 1220 may control the states and the operations of all of the elements constituting the terminal according to the embodiments of FIGS. 7a and 7b, FIGS. 9a and 9b, and FIGS. 11a and 11b. Particularly, the control unit 1220 may determine whether or not the PDSCH symbol is mapped with the CSI-RS resource position allocated to the terminal.

The channel estimating unit 1221 may identify the CSI-RS information received from the central control device, and may estimate the channel using the received CSI-RS. In addition, the data receiving unit 1222 may collect the PDSCH symbol and may restore the data according to the methods of Embodiment 1 to Embodiment 3 set forth above.

Although the terminal, according to the present invention, is described to be comprised of the communication unit 1210 and the control unit 1220 in the embodiment above, the present invention is not limited thereto. That is, the terminal may further include various elements according to functions executed therein. For example, the terminal may further include a display unit that displays the current status of the terminal, an input unit that receives an input signal, such as execution of a function by a user, or a memory that stores the data created in the terminal.

Figure 13:
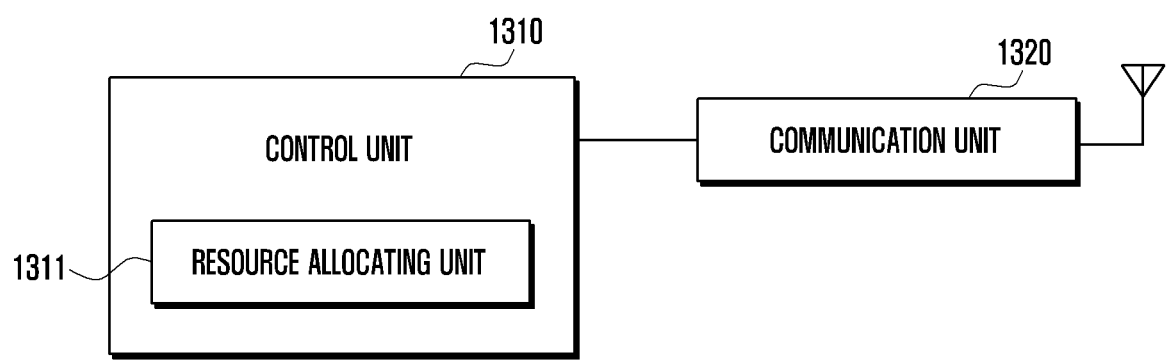
FIG. 13 illustrates a configuration of a downlink data transmitting device, i.e., a central control device according to an embodiment of the present invention.

FIG. 13 illustrates a configuration of the central control device according to an embodiment of the present invention.

Referring to FIG. 13, the central control device may include a control unit 1310, and a communication unit 1320.

The control unit 1310 may control the states and the operations of all of the elements constituting the central control device according to the embodiments of FIGS. 7a and 7b, FIGS. 9a and 9b, and FIGS. 11a and 11b. Here, the control unit 1310 may allocate the CSI-RSs of the cells for the downlink received power or channel estimation of the terminal to the resources transmitted to the terminal, and may identify the PDSCH transmission resource in consideration thereof to map the data symbols. To this end, the control unit 1310 may further include a resource allocating unit 1311.

The resource allocating unit 1311 may allocate the resources and timings, by which the terminal estimates the channel for each cell and measures the downlink power, and may identify the PDSCH resources. At this time, the resource allocating unit 1311 may determine whether or not the rate matching is applied to a specific CSI-RS according to the rule between the base station and the terminal to thereby map the PDSCH resources.

The communication unit 1320 may transmit and receive data to and from the terminal or the cell, which is managed by the central control device. Here, the communication unit 1320 may transmit the CSI-RS and the PDSCH to the terminal through the allocated resources under the control of the control unit 1310.

Those skilled in the art can appreciate that it is possible to implement the present invention in another specific form without changing the technical idea or the indispensable characteristics of the present invention. Accordingly, it should be understood that the embodiments described above are merely exemplary and are not limited. The scope of the present invention is defined by the appended claims to be described later, rather than the detailed description. Accordingly, it should be appreciated that all modifications or variations derived from the meaning and scope of the appended claims and their equivalents are included in the range of the present invention.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method in a wireless communication system, the method comprising:
   transmitting configuration information of a channel state information-reference signal (CSI-RS) to a terminal, the CSI-RS being included in a first set or a second set;
   identifying a resource not used for mapping downlink data symbols based on a first resource of CSI-RS included in the first set without consideration of a second resource of CSI-RS included in the second set;
   mapping the downlink data symbols to a resource except the resource not used for mapping the downlink data symbols; and
   transmitting downlink data on a physical downlink shared channel (PDSCH) to the terminal.

2. The method of claim 1, wherein the first set is a measurement set and the second set is a resource management set.

3. The method of claim 1, wherein, in a case that the configuration information is associated with the first set, the configuration information includes at least one index of CSI-RS included in the first set.

4. The method of claim 1, wherein, in a case that the configuration information is associated with the second set, the configuration information includes at least one index of CSI-RS included in the second set.

5. The method of claim 4, wherein the configuration associated with the second set further includes information on CSI-RS transmission timing and information on the resource for the CSI-RS.

6. The method of claim 1, wherein reference signal received power (RSRP) measured based on the CSI-RS included in the second set is reported via higher layer signaling.

7. A method in a wireless communication system, the method comprising:
   receiving configuration information of a channel state information-reference signal (CSI-RS) from a base station, the CSI-RS being included in a first set or a second set;
   identifying a resource for mapping downlink data symbols; and
   receiving downlink data on a physical downlink shared channel (PDSCH), and
   wherein the resource for mapping the downlink data symbols is identified except first resource of CSI-RS included in the first set, and
   wherein symbols corresponding to a second resource of CSI-RS included in the second set are not considered in a case that the downlink data is received.

8. The method of claim 7, wherein the first set is a measurement set and the second set is a resource management set.

9. The method of claim 7, wherein, in a case that the configuration information is associated with the first set, the configuration information includes at least one index of CSI-RS included in the first set.

10. The method of claim 7, wherein, in a case that the configuration information is associated with the second set, the configuration information includes at least one index of CSI-RS included in the second set.

11. The method of claim 10, wherein the configuration associated with the second set further includes information on CSI-RS transmission timing and information on the resource for the CSI-RS.

12. The method of claim 7, wherein reference signal received power (RSRP) measured based on the CSI-RS included in the second set is reported via higher layer signaling.

13. A base station in a wireless communication system, the base station comprising:
   a transceiver; and
   a controller coupled with the transceiver and configured to control to:
      transmit configuration information of a channel state information-reference signal (CSI-RS) to a terminal, the CSI-RS being included in a first set or a second set;
      identify a resource not used for mapping downlink data symbols based on a first resource of CSI-RS included in the first set without consideration of a second resource of CSI-RS included in the second set;
      map the downlink data symbols to a resource except the resource not used for mapping the downlink data symbols; and
      transmit downlink data on a physical downlink shared channel (PDSCH) to the terminal.

14. The base station of claim 13, wherein the first set is a measurement set and the second set is a resource management set.

15. The base station of claim 13, wherein, in a case that the configuration information is associated with the first set, the configuration information includes at least one index of CSI-RS included in the first set.

16. The base station of claim 13, wherein, in a case that the configuration information is associated with the second set, the configuration information includes at least one index of CSI-RS included in the second set.

17. The base station of claim 16, wherein the configuration associated with the second set further includes information on CSI-RS transmission timing and information on the resource for the CSI-RS.

18. The base station of claim 13, wherein reference signal received power (RSRP) measured based on the CSI-RS included in the second set is reported via higher layer signaling.

19. A terminal in a wireless communication system, the terminal comprising:
   a transceiver; and
   a controller coupled with the transceiver and configured to control to:

receive configuration information of a channel state information-reference signal (CSI-RS) from a base station, the CSI-RS being included in a first set or a second set;

identify a resource for mapping downlink data symbols;

receive downlink data on a physical downlink shared channel (PDSCH), and wherein the resource for mapping the downlink data symbols is identified except a first resource of CSI-RS included in the first set, and wherein symbols corresponding to a second resource of CSI-RS included in the second set are not considered in a case that the downlink data is received.

20. The terminal of claim 19, wherein the first set is a measurement set and the second set is a resource management set.

21. The terminal of claim 19, wherein, in a case that the configuration information is associated with the first set, the configuration information includes at least one index of CSI-RS included in the first set.

22. The terminal of claim 19, wherein, in a case that the configuration information is associated with the second set, the configuration information includes at least one index of CSI-RS included in the second set.

23. The terminal of claim 22, wherein the configuration associated with the second set further includes information on CSI-RS transmission timing and information on the resource for the CSI-RS.

24. The terminal of claim 19, wherein reference signal received power (RSRP) measured based on the CSI-RS included in the second set is reported via higher layer signaling.

* * * * *